United States Patent
French et al.

(10) Patent No.: US 6,998,358 B2
(45) Date of Patent: *Feb. 14, 2006

(54) METHOD FOR PROVIDING NANO-STRUCTURES OF UNIFORM LENGTH

(75) Inventors: Roger Harquail French, Wilmington, DE (US); Timothy Gierke, Wilmington, DE (US); Mark Andrew Harmer, Kennett Square, PA (US); Anand Jagota, Wilmington, DE (US); Steven Raymond Lustig, Landenberg, PA (US); Rakesh H. Mehta, Hockessin, DE (US); Paula Beyer Hietpas, Newark, DE (US); Bibiana Onoa, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 19 days.

This patent is subject to a terminal disclaimer.

(21) Appl. No.: 10/968,569

(22) Filed: Oct. 19, 2004

(65) Prior Publication Data

US 2005/0079666 A1    Apr. 14, 2005

Related U.S. Application Data

(62) Division of application No. 10/406,725, filed on Apr. 3, 2003.

(60) Provisional application No. 60/370,576, filed on Apr. 5, 2002.

(51) Int. Cl.
　　H01L 21/00　　(2006.01)
　　G03D 15/00　　(2006.01)
(52) U.S. Cl. .............. 438/800; 977/DIG. 1; 430/644; 156/598

(58) Field of Classification Search ............... 438/800; 977/DIG. 1; 430/644; 156/598
See application file for complete search history.

(56) References Cited

U.S. PATENT DOCUMENTS

2003/0039816 A1    2/2003   Wang et al.

FOREIGN PATENT DOCUMENTS

JP　　　　07172807　　　7/1995

OTHER PUBLICATIONS

Dresselhaus et al., Carbon nanotubes, Phys. World, Jan., 33, 1988.
P. M. Ajayan et al., Nanometre-size tubes of carbon, Rep. Prog. Phys., vol. 60, p. 1025-1062, 1997.
R. Dagani, Much Ado About Nanotubes, C&E News, Jan. 11, 1999.
Collins et al., Nanotube Nanodevice, Science, vol. 278, p. 100, Oct. 3, 1997.
Yudasaka et al., Effect of an organic polymer in purification and cutting of single-wall carbon nanotubes, Appl. Phys. , vol. 71(4), pp. 449-451, 2000.
Anderson et al., Holographic lithography with thick photoresist, Applied Physics Letters, 43, 9, 874, 1983.
Switkes et al., Immersion lithography at 157 nm, J. Vac. Sci. Technol. B 19, 6, p 2353-6, 2001.
Dai et al., Radiation chemistry for microfabrication conjugated polymers and carbon nanotubes, J. Macromol. Sci., Rev, Macromol. Chem. Phys. 1999, 39, 273.
Xia et al., Soft Lithography, Annu. Rev. Mater. Sci . . . , 28, p. 153-84, 1998.

(Continued)

*Primary Examiner*—Evan Pert

(57) ABSTRACT

This invention relates to the field of nanotechnology. Specifically the invention describes a method for cutting a multiplicity of nano-structures to uniform dimensions of length, length and width, or area, or to a specific distribution of lengths or area using various cutting techniques.

9 Claims, 13 Drawing Sheets

OTHER PUBLICATIONS

Chou et al., Imprint Lithography with 25-Nanometer Resolution, Science, 272, p. 85-87, 1998.

Colbum et al., Step and Flash Imprint Lithography: A New Approach to High-Resolution Patterning, Proc. SPIE vol. 3676, p. 379-389, 1999.

Fan et al., Self-Oriented Regular Arrays of Carbon Nanotubes and Their Field Emission Properties, Science, 283, 512, 1999.

Yoneya et al., Coulomb blockade in multiwalled carbon nanotube island with nannotube leads, Appl. Phys. Lett. 79, 1465-1467, 2001.

Dai, L., Conjugated and Fullerene-Containing Polymers for Electronic and Photonic Applications: Advanced Syntheses and Microlithographic Fabrications, Radiation Phys. And Chem. 62-55-68, 2001.

Xia et al., Unconventional Methods for Fabricating and Patterning Nanostructures, Chem. Rev. 1999, vol. 99 pp. 1823-1848.

Zhang et al., Structure of single-wall carbon nanotubes purified and cut using polymer, Appl. Phys. A 74, pp. 7-10, 2002.

Yudasaka et al., Effect of an organic polymer in purification and cutting of single-wall carbon nanotubes, Appl. Phys. A 71, pp. 449-451, 2000.

Rubio et al., A mechanism for cutting carbon nanotubes with a scanning tunneling microscope, Eur. Phys. J. B 17, pp. 301-308, 2000.

Stepanek et al., Cutting single wall carbon nanotubes, Mat. Res. Soc. Sump. Proc. vol. 593,pp. 120-122, 2000.

Stepanek et al., Carbon Nanotubes and Gas Adsorption, AIP Conf. Proc. 1999, P 456-461.

Zhang et al., Effect of polymer and solvent on purification and cutting of single-wall carbon nanotubes, Chemical Physics Letters, 349, pp. 25-30.

Yoneya et al., Coulomb blockade in multiwalled carbon nanotube island with nanotube leads, Applied Physics Letters, vol. 79, No. 10, pp. 1465-1467.

Park et al., Electrical cutting and nicking of carbon nanotubes using an atomic force microscope, Applied Physics Letters, vol. 80, No. 23, Oct. 6, 2002.

Kuzumaki et al., Selective processing of individual carbon nanotubes using dual-nanomanipulator installed in transmission electron microscope, Appllied Physics Letters, vol. 79, No. 27, Dec. 31, 2001.

Zhang et al., Controllable method for fabricating single-wall carbon nanotube tips, Applied Physics Letters, vol. 77, No. 7, Aug. 14, 2000.

Maurin et al., Segmented and opened multi-walled carbon nanotubes, Carbon 38, 2001, pp. 1273-1278.

Stepanek et al., Nano-mechanical cutting and opening of single wall carbon nanotubes, Chemical Physics Letters 331, 2000, pp. 125-131.

Liu et al., Fullerene Pipes, Science, vol. 280, May 22, 1998, pp 1253-1256.

Kuznetsova et al., Oxygen-Containing Functional Groups on Single-Wall Carbon Nanotubes: NEXAFS and Vibrational Spectroscopic Studies, J. Am. Chem. Soc. 123, pp. 10699-10704, 2001.

Shelimov et al., Purification of single-wall carbon nanotubes by ultrasonically assisted filtration, Chemical Physics Letters vol. 282, pp. 429-434, 1998.

Yanagi et al., Self-orientation of short single-walled carbon nanotubes deposited on graphite, Applied Physics Letters, vol. 78, No. 10, pp. 1355-1357.

Moreau et al., Semiconductor Lithography: Chapter 2 and Chapter 4, Principles and Materials, 1988.

Lustig et al., Lithographically Cut Single-Walled Carbon Nanotubes: Controlling Length Distribution and Introducing End-Group Functionality, Nano Letters, vol. 3, No. 8, 1007-1012, 2003.

Lustig et al., Novel Porcess methodology for uniformly cutting nanotubes, Materials Research Society Symposium Proceedings (2003), 772(Nanotube-Based Devices, pp. 187-192.

METHOD FOR PROVIDING NANO-STRUCTURES OF UNIFORM LENGTH

This application is a divisional of U.S. application Ser. No. 10/406,725, filed Apr. 3, 2003 which claims the benefit of U.S. Provisional Application No. 60/370,576, filed Apr. 5, 2002.

FIELD OF INVENTION

This invention relates to the field of nanotechnology. Specifically the invention describes a method for cutting a multiplicity of nano-structures, and particularly nanotubes to uniform dimensions of length, width, diameter or area,

BACKGROUND OF THE INVENTION

The increasing complexity of electronic devices, and integrated circuits, coupled with the decreasing size of individual circuit elements, place ever more stringent demands on fabrication processes, particularly with respect to resolution and accuracy of the fabrication patterns. The ability to fabricate on a nanometer scale guarantees a continuation in miniaturization of functional devices, in for example, in microelectronic circuitry as well as other applications.

One class of nano-structures are carbon nanotubes (CNT's) which have attracted much attention because of their dimensions and predicted structure-sensitive properties. Carbon nanotubes have a diameter on the order of a few nanometers and lengths of up to several micrometers. These elongated nanotubes consist of carbon hexagons arranged in a concentric manner with both ends of the tube capped by pentagon-containing, buckminsterfullerene-like structures. Nanotubes can behave as semiconductors or metals depending on diameter and chirality of the arrangement of graphitic rings in the walls. Additionally, dissimilar carbon nanotubes may be joined together allowing the formation of molecular wires with interesting electrical, magnetic, nonlinear optical, thermal and mechanical properties.

The unusual properties of nanotubes suggest a diverse number of applications in material science and nanotechnology, including new materials for electron field emitters in panel displays, single-molecular transistors, scanning probe microscope tips, gas and electrochemical energy storage, catalysts, protein/DNA supports, molecular filtration membranes, and energy-absorbing materials (see, for example: M. Dresselhaus, et al., *Phys. World*, Jan. 33, 1988; P. M. Ajayan, and T. W. Ebessen, *Rep. Prog. Phys.*, 60, 1027, 1997; R. Dagani, C&E News, Jan. 11, 31, 1999).

It is known that the atomic arrangement in a carbon nanotube, and hence its electrical properties, may vary drastically along the length of the nanotube (Collins et al., *Science*, 278, 100 (Oct. 3, 1997)). Such a variation in electrical properties may adversely affect the efficiency of electron transport between nano-devices interconnected by the carbon nanotube. Hence, for most of the above applications, it is highly desirable to produce a well-defined specific range or ranges of nanotube lengths such that the properties of individual nanotubes can be assessed and be incorporated effectively into devices. However, existing technology does not provide a means for producing nanotubes of either uniform length, or a well-defined range of length distributions, nor does it provide a means for the rapid and controlled cutting of nanotubes to specific dimensions.

JP 07172807 describes an attempt at controlling the length of generated CNT's. CNT's are irradiated with ions of an appropriate mass and energy sufficient to sever C atomic bonds, producing dangling bonds around the entire circumference of the nanotubes. New CNT's are then grown from these dangling bonds. The method is effective for the cutting of a single CNT however suffers from some significant deficiencies such as an empirical ion selection process and an inability to control the size and length of the newly generated CNT's.

Yudasaka et al., (*Appl. Phys.*, 71 (4): 449–451 (2000) attempts to solve this problem through the use of ultrasonic-homogenization with only moderate success. The method is labor intensive requiring intensive ultrasonic-homogenization in the presence of a polymer solution, filtration, and purification steps and is limited to only single-wall carbon nanotubes.

Lithographic processes have been used for the physical modification of materials on the nano scale. Many of these processes are well developed and include photolithography, interference lithography (sometimes called holographic lithography, see E. Anderson, C. Horowitz, H. Smith, *Applied Physics Letters*, 43, 9, 874, 1983), immersion lithography (see for example M. Switkes, M. Rothschild, *J. Vac. Sci. Technol.* B 19, 6, p 2353–6, 2001), X-ray lithography, electron-beam lithography and ion-beam lithography, micro-contact printing ($\mu$CP), mechanical scaping, micromolding, (see for example, Dai L., J. *Macromol. Sci., Rev. Macromol. Chem. Phys.* (1999) 39, 273), soft lithography (see for example Y. Xia, G. M. Whitesides, *Annu. Rev. Mater. Sci.*, 28, p. 153–84, 1998), nanoimprint lithography of the thermal type (see for example S. Y. Chou, P. R. Krauss, P. J. Renstrom, *Science*, 272, p. 85–87 1996), and the photosensitive type such as step and flash imprint lithography (see for example, M. Colburn, A. Grot, M. Amistoso, B. J. Choi, T. Bailey, J. Ekerdt, S. V. Sreenivasan, J. Hollenhorst, C. Grant Willson, *Proc. SPIE* Vol. 3676 p. 379–389 1999). However, in spite of the highly developed state of lithographic technology, only a few of these techniques have been applied to solving the problem of generating CNT's having uniform physical parameters (Fan et al., *Science*, 283, 512, (1999), Huang et al., Yoneya et al., *Appl. Phys. Lett.* 79,1465–1467, (2001), Dai L., *Radiation Phys. and Chem.* 62, 55–68, (2001)).

The methods described above may be applied to cut CNT's and other nanostructures on a small scale however are not easily adapted for industrial scale CNT modification. Additionally these methods suffer from the limitation of being unable to reproducibly generate populations of nano-structures having uniform physical parameters of length, width, diameter and area. Applicants have solved this problem by providing a method for generating populations of nano-structures and particularly nanotubes having uniform physical properties by cutting large numbers of aligned nanotubes using lithographic technology.

SUMMARY OF THE INVENTION

The invention relates to fabrication of nano-structures of uniform dimension in terms of either length or area. This invention also relates to fabrication of nano-structures with specific distribution of dimensions in terms of either length or area. This invention further relates to construction of devices from such materials for practical applications in many areas of nano-technology.

Accordingly the invention provides a method for cutting a population of nano-structures to a uniform length or distribution of lengths comprising:
- a) coating a population of nano-structures on a solid substrate wherein the nano-structures are spatially fixed on the surface of the substrate;
- b) identifying discrete portions of the coated nano-structures of step (a) according to a patterning system; and
- c) applying a cutting means to the identified discrete portions of the nano-structures of step (b) whereby the nano-structures are cut to a uniform length or distribution of lengths.

Preferred nano-structures of the invention are carbon nanotubes which may be optionally suspended in a dispersant solution prior to coating on the solid substrate. The nano-structures of the invention may be aligned prior to coating the substrate or may be first dispersed in solutions of surfactants for more precise cutting.

Optionally the nano-structures may be recovered from the solid substrate.

Additionally the invention provides a method for cutting a population of nano-rods of uniform length or distribution of lengths comprising:
- a) providing a nano-rod cutting device comprising:
  - (i) a solid substrate;
  - (ii) a first dispersant layer formed on the substrate, said first dispersant layer comprising a population of nano-rods of varying lengths;
  - (iii) a second positive resist layer formed on the first dispersant layer; and
  - (iv) a photomask having a pattern of light transmitting and non-transmitting regions proximate to said second positive resist layer;
- b) exposing the nano-rod cutting device to a light source whereby light is transmitted through the light transmitting regions of the photomask and degrades the second positive resist layer to the level of the first dispersant layer;
- c) removing the degraded positive resist from the device of (b) whereby the first dispersant layer is exposed;
- d) irradiating the device of (c) whereby the exposed dispersant layer is degraded and the nano-rods are cut, producing a population of nano-rods of uniform length or distribution of lengths corresponding to the pattern of light transmitting regions of the photomask.

In another embodiment the invention provides a method for cutting a population of nano-rods of uniform length or distribution of lengths comprising:
- a) providing a nano-rod cutting device comprising:
  - (i) a solid substrate;
  - (ii) a first dispersant layer formed on the substrate, said first layer comprising a population of nano-rods of varying lengths in a dispersant solution;
  - (iii) a second negative resist layer formed on the first dispersant layer; and
  - (iv) a photo-mask having a pattern of light transmitting and non-transmitting regions proximate to said second negative resist layer;
- b) exposing the nano-rod cutting device to a light source whereby light is transmitted through the light transmitting regions of the photomask and crosslinks the second negative resist layer to the level of the first dispersant layer;
- c) removing the unstabilized negative resist from the device of (b) with a negative resist developer whereby the first dispersant layer is exposed; and
- d) irradiating the device of (c) whereby the exposed dispersant layer is degraded and the nano-rods are cut, producing a population of nano-rods of uniform length or distribution of lengths corresponding to the pattern of light transmitting regions of the photomask.

Additionally the invention provides a method for cutting a population of nano-rods of uniform length or distribution of lengths comprising:
- a) providing a nano-rod cutting device comprising:
  - (i) a solid substrate;
  - (ii) a first dispersant layer formed on the substrate, said first layer comprising a population of nano-rods of varying lengths in a dispersant solution; and
  - (iii) a second imprintable resist layer formed on the first dispersant layer; and
- b) contacting the device of (a) with an imprinting substrate such that regions of degradation are created in a pattern on the imprintable resist exposing the dispersant layer;
- c) irradiating the device of (b) whereby the exposed dispersant layer is degraded and the nano-rods are cut, producing a population of nano-rods of uniform length or distribution of lengths corresponding to the pattern applied by the imprinting substrate.

In an alternate embodiment the invention provides a method for cutting a population of nano-rods of uniform length or distribution of lengths comprising:
- a) providing a nano-rod cutting device comprising:
  - (i) a solid substrate;
  - (ii) a first dispersant layer formed on the substrate, said first layer comprising a population of nano-rods of varying lengths in a dispersant solution; and
  - (iii) a second premolded resist layer formed on the first dispersant layer having regions of patterned degradation in the premolded resist exposing the dispersant layer; and
- b) irradiating the device of (a) whereby the exposed dispersant layer is degraded and the nano-rods are cut, producing a population of nano-rods of uniform length or distribution of lengths corresponding to the pattern applied of the premolded resist.

In another embodiment the invention provides a method for cutting a population of nano-rods of uniform length or distribution of lengths comprising:
- (a) providing a nano-rod cutting device comprising:
  - (i) solid substrate affixed to an endless conveyor means;
  - (ii) a first bath of nano-rods in dispersant solution
  - (iii) a second resist bath
  - (iv) a baking means
  - (v) a patterning means
  - (vi) a third developing bath
  - (vii) an irradiating source
  - (viii) a fourth nanostripper bath
- b) moving the solid substrate by way of the conveyor means sequentially into the first bath nano-rods in dispersant solution whereby the solid substrate is immersed in the dispersant solution;
- c) moving the immersed solid substrate of (b) out of the first bath whereby the dispersing is dried and the nano-rods are affixed to the solid substrate;
- d) moving the substrate of (c) into a second resist bath wherein the affixed nano-rods are coated with a resist;
- e) moving the substrate of (d) through a baking means whereby the resist is baked on the substrate;
- f) exposing the substrate of (e) to light through the patterning means whereby the resist is degraded according to the pattern of the patterning means;

g) moving the exposed substrate of (f) into a third developing bath whereby the resist is developed and removed;
h) irradiating the resist-free substrate of (g) such that the nano-rods on the substrate are cut in the pattern produced by the patterning means; and
i) moving the substrate of (h) containing the cut nano-rods into the fourth nano-stripper bath whereby the cut nano-rods are removed from the substrate and recovered.

In another embodiment the invention provides a method for cutting a population of nano-rods of uniform length or distribution of lengths comprising:
a) providing a nano-rod cutting device comprising:
(i) a solid substrate; and
(ii) a dispersant layer formed on the substrate, said dispersant layer comprising a population of nano-rods of varying lengths in a dispersant solution;
b) bombarding the dispersant layer with an electron beam whereby the dispersant layer is degraded and the nano-rods are cut, producing a population of nano-rods of uniform length or distribution of lengths.

Additionally the invention provides a nano-structure cutting device comprising:
(i) a solid substrate;
(ii) a first dispersant layer formed on the substrate, said first layer comprising a population of aligned nano-rods of varying lengths in a dispersant solution;
(iii) a second resist layer formed on the first dispersant layer; and
(iv) a photo-mask having a pattern of light transmitting and non-transmitting regions proximate to said second resist layer.

Alternatively the invention provides a method of fabricating a nano-structure cutting device comprising:
(a) providing a solid substrate;
(b) forming a first dispersant layer on said substrate said first layer comprising a population of nano-structures of varying lengths in a dispersant solution;
(c) baking the dispersant layer on said substrate to remove excess dispersant and to affix said nano-structures to said substrate;
(d) forming a second resist layer formed on the first dispersant layer; and
(e) affixing a photo-mask having a pattern of light transmitting and non-transmitting regions proximate to said second resist layer.

Additionally the invention provides a population of nano-structures having a distribution of lengths and a device comprising the nano-rods produced by the method the invention.

DETAILED DESCRIPTION OF THE INVENTION

Figure 1A:
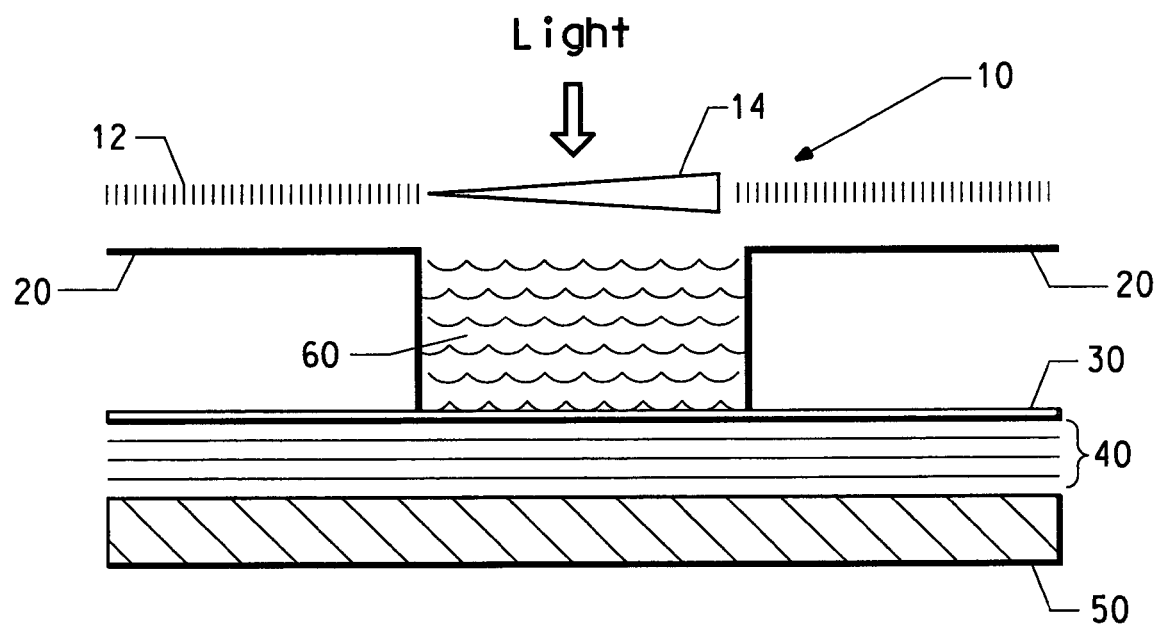
FIG. 1 Illustrates the basic method where the method involves a negative photoresist.

The present invention provides a method for cutting a multiplicity of nano-structures to uniform dimensions of length, length and width, or area, or to a specific distribution of lengths or area using various cutting techniques. The invention applies to cutting of small objects such as tubes, rods, cylinders, bundles, wafers, disks, sheets, plates, planes, cones, slivers, granules, ellipsoids, wedges, polymeric fibers, natural fibers, and other such objects which have at least one characteristic dimension less than about 100 microns. Such objects are fixed spatially on a solid surface and a cutting pattern is applied to the surface. After cutting, the objects may optionally be subject to post-cutting treatment such as chemical functionalization, modification or termination at the cut ends if the cutting pattern protects the object regions distal to the cut surface. Furthermore after cutting the objects may optionally be removed from the surface. This cutting method is industrially attractive as it can be employed to generate a single desirable length distribution.

Nano-structures having metallic or semiconductor properties which are cut to specific dimensions have utility in the construction of nano-scale electrical machines and circuits, useful in the electronics, communications computer and other industries. For example large scale production of nanotubes with attributes of uniform length or specific size-distribution can be used in electronic applications such as field-emission transistors, artificial actuators, molecular-filtration membranes, energy-absorbing materials, molecular transistors, and other optoelectronic devices as well as in gas storage, single-electron devices, and chemical and biological sensors.

In this disclosure, a number of terms and abbreviations are used for the interpretation of the claims and the specification. The following definitions are provided:

Scanning Electron Micrograph" will be abbreviated "SEM"

Atomic Force Microscopic" will be abbreviated "AFM".

n-methylpyrolidonone will be abbreviated "NMP".

Anti-Reflective Coating will be abbreviated "ARC".

Tetrahydrofuran will be abbreviated "THF".

The term "nano-structure" means tubes, rods, cylinders, bundles, wafers, disks, sheets, plates, planes, cones, slivers, granules, ellipsoids, wedges, polymeric fibers, natural fibers, and other such objects which have at least one characteristic dimension less than about 100 microns.

The terms "nano-rod" means a variety of nano-structures which may be either hollow or solid and may or may not have a circular cross-sectional shape. Nano-rods of the invention may include nanotubes, nanofibers, polymeric nanofibers, bundles and multiwalled structures.

The term "nanotube" refers to a hollow article having a narrow dimension (diameter) of about 1–200 nm and a long dimension (length), where the ratio of the long dimension to the narrow dimension, i.e., the aspect ratio, is at least 5. In general, the aspect ratio is between 10 and 2000.

By "carbon-based nanotubes" or "carbon nanotube" or "CNT" herein is meant hollow structures composed primarily of carbon atoms. The carbon nanotube can be doped with other elements, e.g., metals.

"Lithography" describes a general method used herein to produce the nano-structures of specified dimensions via a system of patterning a material and degrading the material in accordance with the pattern. "Photolithography" is a specific form of lithography where light is used as the degrading force. In a photolithographic method, a photoresist is exposed to electromagnetic radiation, for e.g., ultraviolet light (UV), deep ultraviolet light (DUV), extreme ultraviolet light (EUV) or X-ray. This exposure introduces a latent image on the photoresist, for example, a pattern with difference in solubility. This results from chemical changes in the molecular structure of the resist. The latent image is subsequently developed into relief structures through etching. Electron beam irradiation, or ion-beam irradiation can be used instead of electromagnetic radiation. The exposure is usually patterned either by interposing a mask between the source of radiation and the material or by scanning a focused spot of the source across the surface of the material. When masks are used, the lithographic process yields a replica (for example, reduced in size) of the pattern on the mask. "Nanoimiprint lithography" is a lithographic method employing an "imprintable resist" in the place of a photoresist. The imprintable resist is typically a polymeric material and is imprinted by an imprinting substrate that applies a pattern to the resist. Alternatively nanoimprint lithography may be practiced using a premoded resist. "Premolded resists" are liquid polymers that are pored over a substrate in a manner such that a pattern of ridges and valleys are formed. "Immersion lithography" is a variation of photolithography where an oil ("immersion oil") is interposed between the resist and the photomask prior to irradiation. The effect of the immersion oil in this process is to reduce the size of the pattern and permit more cuts by the irradiating source.

The term "patterning system" refers to any means of creating a suitable pattern for the direction of a cutting means on an immobilized population of nano-structures. In the art of photolithography (including contact, proximity or projection photolithography) a typical patterning system will involve the use of a photomask. In interference lithography a photomask is not used, instead optical interference of two opposed beams of light cause the modulation of the light. In immersion lithography, of either the projection or the interference type, the presence of the immersion fluid allows the production of much finer feature patterns in the photoresist, and therefore will permit finer cutting. In other lithography methods, such as nanoimprint lithography or soft lithography, a lithographic mask, master replica or stamp is used.

The term "lithographic mask" or "photomask" or refers to the master mask that defines the pattern of radiation incident on the photoresist. As used herein, a photomask may include a flexible sheet element having areas which are transparent to radiation incident on the photosensitive layer and complementary areas which are effectively opaque to that radiation; the opaque and transparent area defining the complementary image features to be transferred to the photosensitive layer. Typically the photomask is in a projection lithography stepper, where the projection lens is located between the photomask and the photoresist coated substrate, in the case of proximity or contact lithography, the photomask is "proximate" to or in contact with the resist layer of the cutting device. It will be understood that by "proximate" it is meant that the mask is sufficiently close so as to be in the line of photons thereby effecting a pattern on the resist.

As used herein, a "plasma" refers to an assembly of ions, electrons, neutral atoms and molecules in which particle motion is governed primarily by electromagnetic forces. The term plasma may also refer to a partially ionized gas containing an approximately equal number of positive and negative charges, as well as some other number of non-ionized gas species.

The term "solid substrate" refers to any suitable substrate on which the nano-structures can be applied and which are capable of withstanding the patterned cutting of the nanotubes.

A "baking means" will refer to a mechanism for baking or drying a resist or dispersant layer such that it bonds to the surface on which the layer has been placed, or such that the layer is chemically altered in some way. Typically baking means incorporated heat sources.

The term "dispersant" or "dispersant solution" refers to an agent which spatially fixes the objects to be cut on the solid substrate and enables the coating process of the nano-structures on the substrate.

The term "separator material" refers to any material useful for separating layers of dispersant containing nano-structures. Often separator materials may be comprised of the same material as the dispersant and often may be polymeric in nature.

The term "nanotube stripper" will refer to a solvent useful for removing nanotubes and other nano-structures from a solid substrate.

The term "aligned" as it refers to nanotubes in a dispersant solution refers to the orientation of an individual nanotube or aggregate of nanotubes with respect to the others (i.e., aligned versus non-aligned). As used herein the term "aligned" may also refer to a 2 dimensional orientation of nano-structures (laying flat) on a substrate.

By "nanoplanes" is meant surfaces which have one characteristic dimension less than 500 nanometers, for example a single or a dual layer of graphite or graphene sheets.

By "nanofibers" is meant natural or polymeric filaments which have one characteristic dimension of less than 1000 nanometers.

The present invention provides a general method for cutting a population of nano-structures to a uniform length or distribution of lengths comprising a) coating a population of nano-structures on a solid substrate wherein the nano-structures are spatially fixed on the surface of the substrate; b) identifying discrete portions of the coated nano-structures of step (a) according to a patterning system; and c) applying a cutting means to the identified discrete portions of the nano-structures of step (b) whereby the nano-structures are cut to a uniform length or distribution of lengths. In a preferred embodiment the invention utilizes standard photoresist technology coupled with ion irradiation for the cutting process.

Figure 1B:
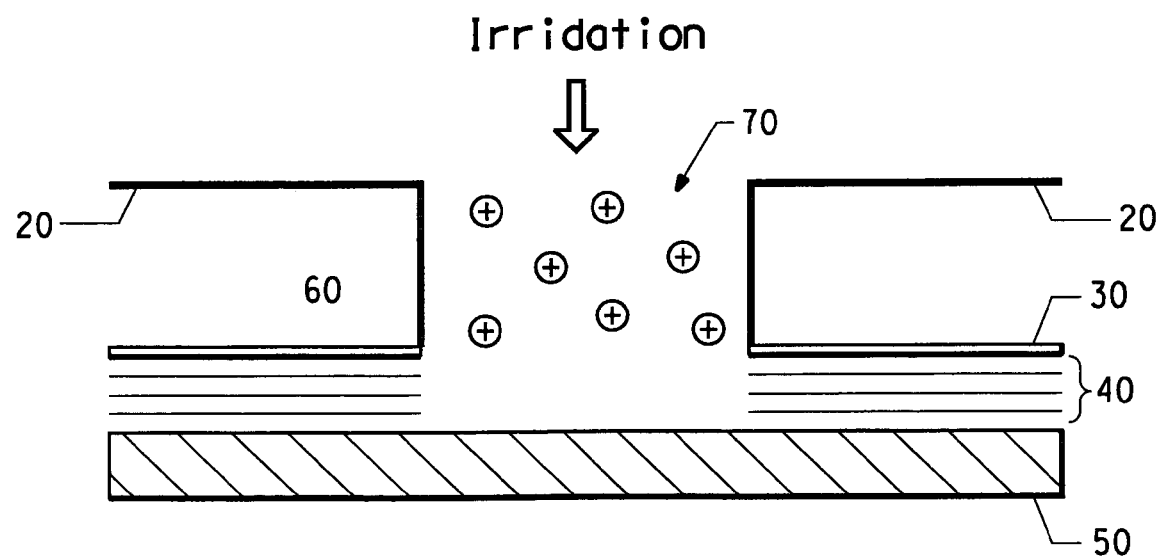

The general method may best be understood by making reference to the Figures. Where typical photoresist technology is used, either a negative or positive resist method may be employed for the cutting process. The negative resist method is illustrated in FIG. 1. As shown in FIG. 1, a nano-structure cutting device is assembled comprising a photomask (10) set proximate to a negative resist (20), which in turn is in contact with a dispersant layer (30). The photomask (10) is comprised of light transmitting (12) and light non-transmitting (14) regions.

Admixed within the dispersant layer (30) is a population of nano-structures (40). The dispersant layer (30) is positioned on a solid substrate (50). Adjustments to the shape or the spacing of the light non-transmitting regions of the photomask (14) will result in changes in the length or the distribution of lengths or the population of nano-structures (40) that are cut.

The method proceeds when the negative resist is selectively exposed to electromagnetic radiation via a light transmitting section of the photomask (12) and crosslinks the exposed section of the negative resist material (20). Optionally the noncrosslinked material may be removed by the application of a negative resist developer (60), revealing a portion of the dispersant layer (30) containing the population of nano-structures (40).

After removal of the noncrosslinked negative resist, a cutting means (70), (typically irradiation with ions, plasma or electrons), is applied to the exposed dispersant layer (30) which results in the cutting of the nano-structures (40) contained in the dispersant layer (30).

Figure 2A:
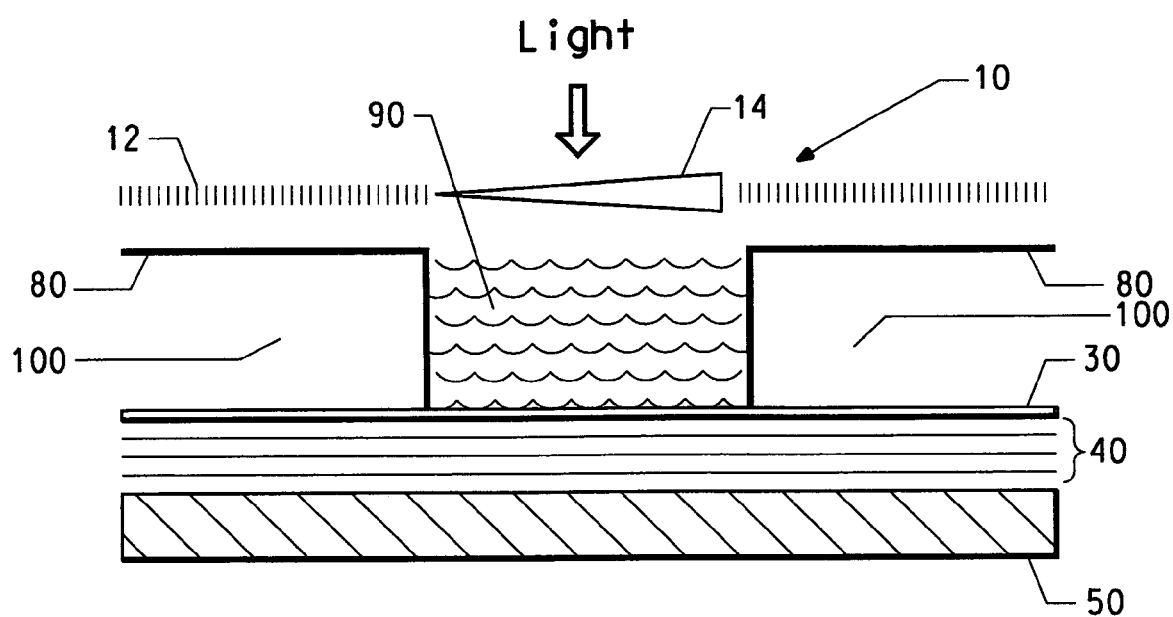
FIG. 2 Illustrates the basic method where the method involves a positive photoresist.
Figure 2B:
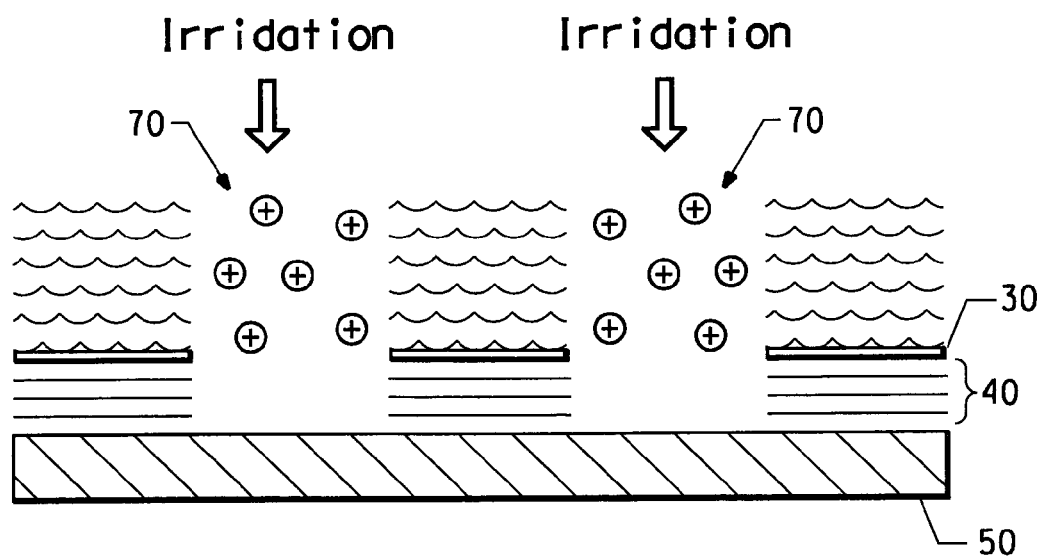

In another preferred embodiment the method makes use of a positive resist as opposed to a negative resist. Referring to FIG. 2, the cutting device is assembled essentially as with the negative resist method except a positive resist layer (80) is included in the place of the negative resist. Exposure of the photomask (10) to light results in degradation of the positive photoresist material in the light transmitting region of the photomask (12), while in the non-light transmitting regions (90) the photoresist persists without degradation. A positive photoresist developer (100) is then applied which removes the degraded portion of the positive photoresist (80). When the cutting means (70), (typically irradiation with ions, plasma or electrons) is applied the nano-structures (40) within the dispersant layer (30) are cut.

In another preferred embodiment the method makes use of projection lithography with a negative (refer to FIG. 1) or a positive resist (refer to FIG. 2) but where the photomask is no longer in contact or proximity to the photoresist layer. Exposure of the photomask to light in a projection lithography stepper or an immersion projection lithography stepper results in crosslinking of the negative resist or degradation of the positive photoresist material in the exposed regions. A photoresist developer is then applied which degrades the uncrosslinked portion of the negative photoresist, or removes the degraded regions of the positive photoresist. When the cutting means, (typically irradiation with ions, plasma or electrons) is applied the nano-structures within the dispersant layer are cut.

In another preferred embodiment the method makes use of a positive or negative resist, the cutting device is assembled as in the negative resist case, except no photomask is necessary to produce the spatially varying latent image in the photoresist. Instead an interference photolithography stepper operating at any lithography wavelength is used (as discussed by Smith or Switkes, supra, for use with 333.6 or 157 nm light) and the optical interference of two beams of light produces the spatially varying intensity of light in the photoresist layer, to produce the latent image. The positive or negative resist is then developed. Referring to FIG. 1, when the cutting means (70), (typically irradiation with ions, plasma or electrons) is applied the nano-structures (40) within the dispersant layer (30) are cut.

In another preferred embodiment the method make use of nanoimprint lithography of the thermal type to produce a replica of the master mask pattern into a thermally deformable polymer layer. The mask is then removed and the polymeric replica of the master mask is used as the pattern transfer layer for the cutting process. Referring to FIG. 1, when the cutting means (70), (typically irradiation with ions, plasma or electrons) is applied the nano-structures (40) within the dispersant layer (30) are cut.

In another preferred embodiment the method makes use of nanoimprint lithography of the photosensitive type, typically referred to as step and flash nanoimprint lithography, to produce a replica of the master mask pattern. In this case the master mask pattern is brought into contact with the into a thermally deformable polymer layer. The mask is then removed and the polymeric replica of the master mask is used as the pattern transfer layer for the cutting process. Referring to FIG. 1, when the cutting means (70), (typically irradiation with ions, plasma or electrons) is applied the nano-structures (40) within the dispersant layer (30) are cut.

Figure 3A:
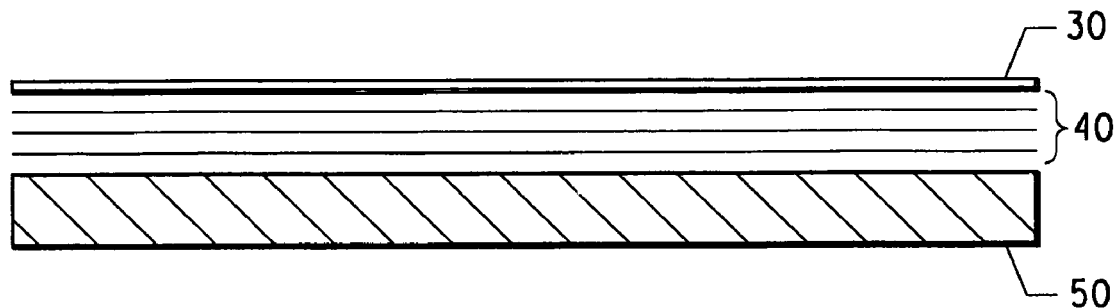
FIG. 3 Illustrates the basic method where the method involves cutting with an electron beam.
Figure 3B:
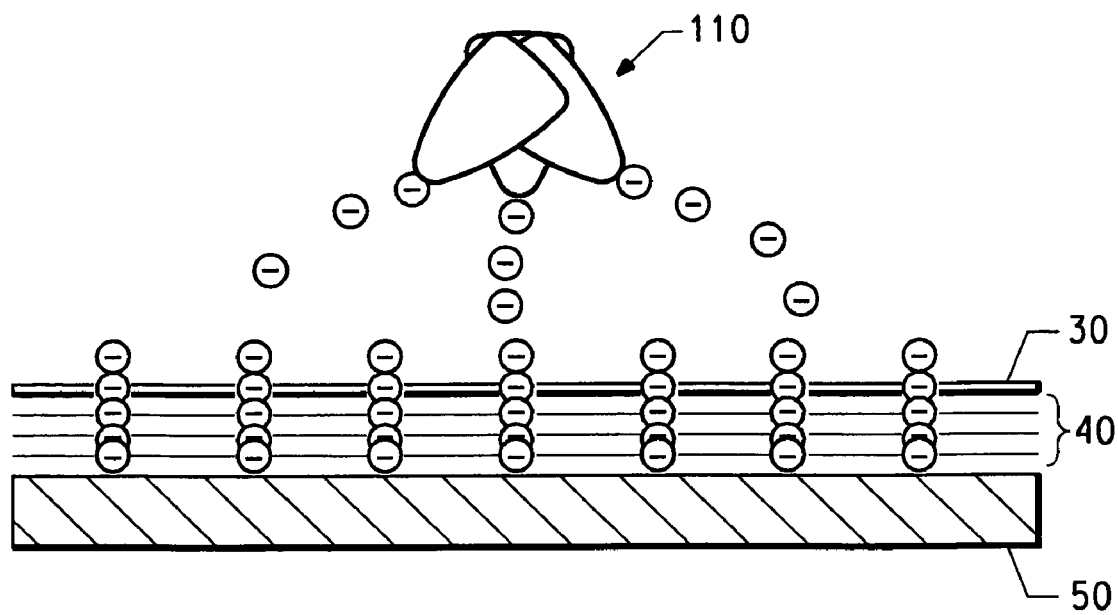

Another embodiment of the invention is illustrated in FIG. 3. In this embodiment the cutting device is comprised only of a dispersant layer (30) having a population of nano-structures (40) admixed within. The dispersant layer (30) is coated on a solid substrate (50). A cutting means comprising an electron beam (110) is applied to the device in a patterned method so as to cut the nano-structures (40) in a uniform manner.

The skilled artisan will recognize that other applications of the invention will be possible following the disclosure herein of the basic method. For example it is contemplated that a method of continuous cutting of nanotubes will be possible using a system that will allow for the movement of the solid substrate through baths of various components of a nanotube cutting device. This could be accomplished for example if the solid substrate were attached to an endless conveyor means such as a belt. The belt comprising the substrate could be moved into a bath containing carbon nanotubes in a dispersant solution. On leaving the dispersant bath the solution would be dried, and then the substrate moved into a bath containing a liquid resist. The resist could be baked on the substrate by moving the belt through a baking oven and then exposing the resist to patterned light where the resist is degraded. Moving the degraded resist into a developing bath would remove the resist exposing sections of the nanotubes and irradiation would result in cutting of the exposed nanotubes which could then be recovered.

Nano-structures

The invention provides a means for cutting a variety of nano-structures while immobilized on a solid substrate. Nano-structures suitable for cutting by the present invention may have a variety or shapes including tubes, rods, cylinders, bundles, wafers, disks, sheets, plates, planes, cones, slivers, granules, ellipsoids, wedges, polymeric fibers, natural fibers, and are limited only in that they should have at least one characteristic dimension less than about 100 microns.

For example, nanoplanes may be cut to specific dimensions using the methods of the invention. Typical nanoplanes may be comprised of a variety of materials where graphite is common. The cut graphite sheets can be used to make electrical connections between more than one location simultaneously in a nanoelectric circuit. If an electrical connection is to be made simultaneously between 3 or more locations (where the 3 locations do not follow in a straight line), one graphite surface can be cut to fit a contact at just each location and thereby only one object is needed to perform the task. This use of cut graphite planes has the advantage of making all the connections simultaneously. Typically the graphite nanoplane is a single layer of graphite, however may also comprise multiple layers of graphite.

Particularly suitable nano-structures of the invention are nano-rods. Nano-rods amenable to the cutting process of the invention may include, but are not limited to nanotubes, and nanofibers, including carbon nanotubes, and polymeric nanofibers, bundles and multiwalled structures.

Suitable polymeric nanofibers will include nanofibers made from a variety of materials including polylactic acid, polyglycolic acid, polyethylene glycol, nylons, polyesters, polyethylenes, polypropylenes, polystyrene, polybenzimidazole, polyacrylonitrile, polyurethane, poly aryl ketones, polyimides, polyacrylates, polyphenylene sulfide, polymeric lactones, polystyrene, polysachharides, polytetrafluoroethylene, polyaniline, poly ethylene oxide, polyaramids, DNA, protein, and collagen. Other polymers from which fibers can be generated, for example thermoplastic elastomers, or cross-linked elastomers can also be used.

Preferred nano-rods in the present invention are nano-tubes, where carbon based nanotubes (CNT's) are most preferred. Nanotubes of the invention are generally about 1–200 nm in length where the ratio of the length dimension to the narrow dimension, i.e., the aspect ratio, is at least 5. In general, the aspect ratio is between 10 and 2000. Carbon nanotubes are comprised primarily of carbon atoms, however may be doped with other elements, e.g., metals. The carbon-based nanotubes of the invention can be either multi-walled nanotubes (MWNTs) or single-walled nanotubes (SWNTs). A MWNT, for example, includes several concentric nanotubes each having a different diameter. Thus, the smallest diameter tube is encapsulated by a larger diameter tube, which in turn, is encapsulated by another larger diameter nanotube. A SWNT, on the other hand, includes only one nanotube.

It will be appreciated by the skilled artisan that the cutting methods of the invention will apply to chemically modified nano-structures as well as those that are unmodified. Soluble full-length single wall nanotobes can be formed by reacting the tubes with octadecylammonium, SWNT—carboxylate zwitterions by the reaction of acid modified SWNT—with octadecylammonium amines (see for example *J. Phys. Chem. B*. Vol. 105, No. 13, 2001, page 2526). Rational modification will provide nano-structures of greater solubility in a particular dispersant, resulting in higher concentrations of structures for cutting.

Placement of Nano-structures on the Solid Substrate

The invention provides that a population of nano-structures be placed on a solid substrate for cutting. Solid substrates useful in the present invention are those generally amenable to microlithographic or photolithographic techniques and which can withstand the cuting conditions. Solid substrates are comprised of materials which include but are not limited to silicon, silicon dioxide, glass, metal, metal oxide, metal alloy, polymers ceramics crystals and combinations thereof. Particularly suitable substrates will be comprised of for example, quartz glass, alumina, graphite, mica, mesoporous silica, silicon wafer, nanoporous alumina, and ceramic plates. Preferably, the substrate is quartz glass or silicon wafer.

Optionally it may be useful to prepare the surface of the solid substrate so that it will better receive and bind the nano-structures. For example the solid substrate may be micro-etched or may be coated with materials for better nano-structure adhesion and alignment. Materials suitable for coating the substrate include, but are not limited to metal oxides (e.g., $Al_2O_3$, $TiO_2$, and $MgO$), metal carbides, metal nitrides, metal sulfides, metal borides, gallium arsenide, aluminum arsenide, aluminum sulfide, gallium sulfide, surfactants, proteins and combinations thereof.

Typically placement of the nano-structures on the solid substrate is accomplished by first admixing the nano-structures with a dispersant material or polymer. Suitable dispersants are those that will allow for an even distribution of nano-structures and which will cure or dry forming a firm layer in response to heat.

A dispersant can be any solvent or coating which is capable of spreading and spatially fixing the objects to be cut, for example a collection of nanotubes to be cut, on a substrate. The dispersant optionally serves as a suspension medium for the objects to be cut, spreads the objects to be cut on the substrate. For example coating of the substrate may be accomplished by spin-coating, followed by baking, and then cooling of the substrate. Where dispersants are solvents they may optionally be evaporated away after the coating process. Low viscosity solvents have certain advantages over polymeric type dispersants. Low viscosity dispersants such as dichlorobenzene/chloroform may be evaporated off the surface of the substrate leaving a mat of nanotubes that are more precisely cut than where the nanotubes are embedded in a polymeric material.

In some instances polymer dispersant materials may be used. Useful in the present invention are polymeric dispersants which include but are not limited to methacrylic copolymers, and homopolymers optionally having a variety of functional and pendant groups. The composition of polymer dispersants used in the art of photolithography are well known and examples of the same are given in JP 11349842 and U.S. Pat. No. 4,656,226, herein incorporated by reference.

Solvent dispersants useful in the invention include but are not limited to substituted benzenes (e.g. dichlorobenzene) and/or mixtures of solvents as for example dichlorobenzene/ chloroform and chloroform and dimethylformamide. Additionally various surfactants may be used as dispersants, including but not limited to Triton™ X100 and also Tergitol™ TMN-6 (Union Carbide, Danbury, Conn.).

Typically the nano-structures or nanotubes are suspended in the dispersant and spin coated on the surface of the solid substrate. In some cases it may be necessary to sonicate the nano-structures for suspension in the dispersant. Depending on the polarity of the dispersant and the composition of the nano-structures this process may result in aligning the nanotubes so that they present to the cutting means in a uniform fashion.

In some situations it may be useful to protect the side walls of nanotubes to facilitate functionalization of the nanotube post cutting. In these cases it may be useful to interpose a layer of a polymer matrix between layers of dispersant/nanotube compositions. In these situations a dispersant containing nanotubes will be coated on the surface of a substrate, followed by a coating of a separator material typically consisting of a polymer which in turn may be coated with another layer of dispersant/nanotubes. This layering process has the effect of protecting nanotube side wall from extensive damage during the cutting process and facilities the addition of pendant groups after recovery of the nanotubes from the substrate. Any polymeric material may be used as the separator material where water soluble polymers are preferred and polylactide and polyvinyl alcohol are most preferred.

In a preferred embodiment it may be desirable to disperse nanotubes prior to their coating on the substrate. Typically, nanotubes take the form of "rope" which aggregations of highly polarized, nanotubes which readily form parallel bundles or ropes with a large van der Waals binding energy. Some separation of the ropes occurs when nanotubes are placed in a dispersant solution, however additional dispersion may be useful to effect more precise cutting. Methods of dispersing nanotube ropes are known in the art and generally involve sonication or the use of surfactants (J. Liu et al., *Science* 280, 1253 (1998); M. J. O'Connell et al., *Chem. Phys. Lett.* 342, 265 (2001); S. Bandow et al.,*J. Phys. Chem.* B 101, 8839 (1997); J. Chen et al., *Science* 282, 95 (1998); G. S. Duesberg, J. Muster, V. Krstic, M. Burghard, S. Roth, *Appl. Phys.* A 67, 117 (1998); A. B. Dalton et al., *J. Phys. Chem.* B 104, 10012 (2000); A. B. Dalton et al., *Synth. Metals* 121, 1217 (2001); R. Bandyopadhyaya, E. Nativ-Roth, O. Regev, R. Yerushalmi-Rozen, *Nano Lett.* 2, 25 (2002)). Additionally Applicants have disclosed in co-pending U.S. Provisional Application No. 60/428,087 a method for dispersion of nanotube ropes involving associating the ropes with DNA fragments.

Accordingly in a preferred embodiment of the invention the nanotubes are dispersed prior to solublization in the dispersant where the use of sonication, surfactants or DNA association are preferred.

Patterning Systems and Cutting Means

The present invention employs a patterning system for directing the energy used in a cutting means onto the population of nano-structures. Suitable patterning systems for cutting an immobilized population of nano-structures on a solid surface may include but are not limited to topographically directed etching, printing, molding, and embossing. For a review of methods for fabricating and patterning nano-structures see for example Xia et al., *Chem. Rev. American Chemical Society*, Vol 99, 1823–1848, 1999.

Particularly suitable in the present invention is a patterning system based on a method that employs standard photoresist technology coupled with ion irradiation for the cutting process. The method proceeds by spreading the nano-structures or nanotubes, which have been premixed in a dispersant solution, and layering the tubes on the surface of a suitable solid substrate. This layer is then covered with a photoresist polymer, onto which a photomask is applied. For proximity or contact photolithography, or for projection lithography the photomask pattern is projected into the photoresist layer. When the resist is exposed to light through the photomask and developed, it is altered down to the level of the dispersant/nanotubes in a pattern corresponding to the photomask. The photoresist image is then developed using, typically, an aqueous base such as 0.26 Normal tetramethylammonium hydroxide (TMAH) and the soluble photoresist rinsed away. Other solvents useful for developing and removing resists include but are not limited to dimethyl acetamide NMP, ethanol, butanol, and THF.

The exposed dispersant/nanotubes are then irradiated with a source of ions, through the photomask with a specific pattern, and cutting of the nanotubes takes place. In this fashion nanotubes of a length corresponding to the photomask are uniformly produced.

Negative or positive resist materials comprise two families of photoactive or radiation-sensitive material. Negative resists become less soluble after exposure to radiation, and thus the unexposed areas can be removed by treatment with an appropriate solvent or developer. Positive resists, on the other hand, increase in solubility upon exposure, enabling the exposed regions to be removed in the solvent or developers. The areas of resist that remain following the imaging and development processes are used to mask the underlying substrate for subsequent etching or other image-transfer steps. If, for example, the underlying substrate or base were SiO2, immersion of the structure into an etchant such as buffered hydrofluoric acid would result in selective etching of the SiO2 in those areas that were bared during the development step. Resist material can be classified as positive or negative on the basis of their radiation response (Thompson et al., Introduction to Microlithography, American Professional Reference Book, pages 14–15 and 155–156, American Chemical Society, Washington, D.C., (1994)).

Where the production of a particular distribution of cut nano-structures is desired it may be necessary to vary the pattern and spacing of the light non-transmitting and light transmitting regions of the photomask. In the context of the present invention it is particularly suitable to employ a photomask that applies a pattern selected from the group consisting of a rectangle, and a circle or combinations thereof.

The next step in the process involves exposure of the cutting assembly at desirable regions through a pre-patterned photomask. The assembly structure is then developed so that the developed material has the pattern of the mask. In addition to cutting the nanostructures to specified lengths, the etching process also removes undesirable nanostructures from other areas of the wafer. Cutting is accomplished by the utilization of ionized radiation including but not limited to photon irradiation utilizing ionized radiation such as ultraviolet rays, X-rays, electron irradiation, ion-beam irradiation, plasma ionization, and neutral atoms machining. Specifically, deep-UV rays having a wavelength of 254 to 120 nm, an excimer laser, especially ArF excimer laser (193 nm), $F_2$ excimer laser (157 nm), $Kr_2$ excimer laser (146 nm), KrAr excimer laser (134 nm) or Ar excimer laser (121 nm), x-rays, or an electron beam are particularly useful.

Typically the cutting process results in cutting about 85% to about 100% of the nano-structures to a uniform length, and nano-structures are produced having a length of about 10 nm to about 1000 nm, where lengths of about 10 nm to about 400 nm is typical.

Subsequently, the latent pattern on the photoresist is etched out and nanotubes in the exposed region are degraded. Nanotubes can be processed with reactive ion etching, or other chemical means to degrade and ultimately remove those sections of nanotubes that are not protected by the photoresist.

Following the etching process, the resist is removed for example, by stripping, hydrolysis, dissolution, or reaction. Developers useful in the present invention may include for example, aqueous alkali solution, such as 0.1 to 5%, and preferably 2 to 3%, tetramethylammonium hydroxide (TMAH). Developers may be applied by a conventional method such as dipping, puddling, or spraying for a period of 10 seconds to 3 minutes, and preferably 30 seconds to 2 minutes.

It will be apparent to the skilled artisan that lithographic techniques may be used for the cutting of nanotubes as described herein. For example, any lithographic method that provides for an cutting or etching process in accordance with a patterning system is suitable including but not limited to Contact photolithography, proximity photolithography, projection photolithography, interference photolithography, immersion projection photolithography, immersion interference photolithogrpahy, nanoimprint of thermal type, nanoimprint of optical type (step and flash) and soft lithography.

Recovery of Cut Nanotubes

After irradiation and cutting the nanotubes are generally removed from the solid substrate for further processing. Methods of removal vary and include, but are not limited to sonication, or the application of a nanotube stripper such as a strong acid or base, sometimes in the presence of oxidizing argents such as hydrogen peroxide. Some examples of agents useful for removal of nanotubes from the solid substrate include, sodium hydroxide, sulfuric acid and/or hydrogen peroxide.

After the nanotubes are removed from the substrate they may be further purified by means of filtration or centrifugation.

Assembly and Operation of the Cutting Device

The cutting device of the invention is assembled using known lithographic techniques. For example, the resist composition may be applied onto a substrate such as a silicon wafer by spin coating or the like to form a resist film which is then pre-baked on a hot plate at 60° C. to 200° C. for 10 seconds to 10 minutes, and preferably at 80° C. to 150° C. for ½ to 5 minutes. In the contact, proximity or projection lithography approach a patterning mask having the desired pattern may then be placed over the resist film and the film exposed through the mask to an electron beam or to high-energy radiation having a wavelength below 300 nm such as deep-UV rays, excimer laser light, or x-rays in a dose of about 1 to 200 mJ/cm$^2$, and preferably about 10 to 100 mJ/cm$^2$, then post-exposure baked (PEB) on a hot plate at 60° C. to 150° C. for 10 seconds to 5 minutes, and preferably at 80° C. to 130° C. for ½ to 3 minutes. Finally, development may be carried out using a developer such as TMAH. These steps result in the formation of the cutting device which will form the desired pattern on the substrate.

Cutting a Specific Distribution of Lengths

A particularly useful application of the cutting process is to cut nanotubes into a predictable distribution of lengths while keeping the tubes protected and unreacted in regions distal from the cutting planes. We may choose microlithographic techniques to spatially fix the nanotubes on a solid substrate. Microlithography permits an arbitrarily-shaped pattern which define regions where tubes will be cut and where tubes will be protected.

Parallel Rectangles

Figure 4A:
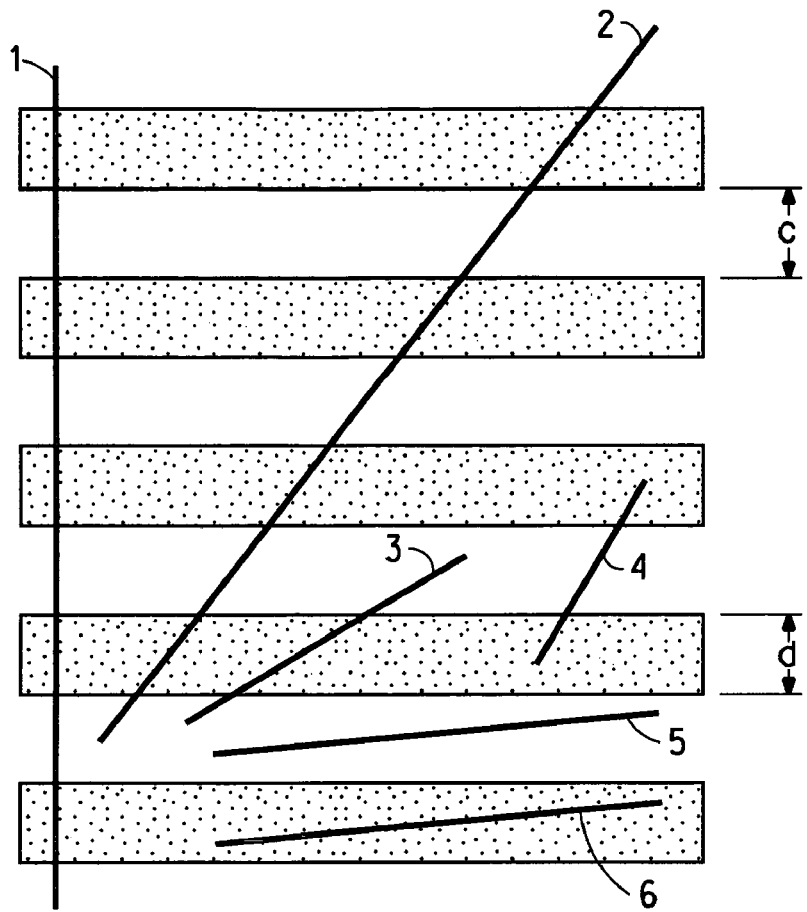
FIG. 4 illustrates the production of a composition comprising nano-structures having a specific distribution of lengths where a rectangular patterning system is used.
Figure 4B:
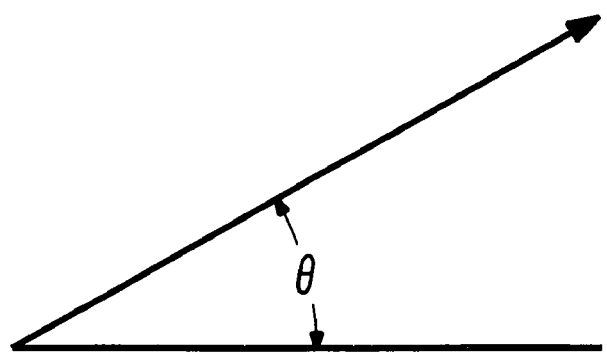

Referring to FIG. 4, the gray regions are shown as the part of the resist coating which protects the nanotubes shown schematically as solid black lines. Tube sections (labeled as 1–6) within the gray pattern will be protected from cutting by the resist coating, while tube sections within the white regions will be removed. In this example the white, cutting regions have characteristic separation, c, and the gray, protected regions have characteristic separation, d. We may define the orientation angle, θ, of a given nanotube with respect to the gray-white cutting interface. It is possible, but not necessary, to align the nanotubes so that essentially all tubes have a perpendicular orientation angle with respect to the cutting interface in the plane of the interface, such as tube 1 shown above. Thus tube 1 will be cut into several sections, each of length d. Tubes 2 and 3 will be cut to slightly longer segments of length d/sin(θ), where the angle is given respectively for each tube. Tube 4 will be cut into segments slightly shorter than length d since the ends terminate within the protected gray resist coating. No segments of Tube 5 will be retained since it lies completely within a white cutting region. In contrast, the entire length of Tube 6 will be retained since it lies completely within a protected resist coating region.

For the above cutting pattern we can predict the distribution of cut segments retained from simple geometry described previously given a probability distribution function, P(θ), for the orientation of objects. For example, if we choose c=0.0001, d=0.01 and all tubes have unit length are randomly aligned. Then the distribution of segments retained from the cutting process is shown below in the solid black curve of FIG. 5.

Figure 5:
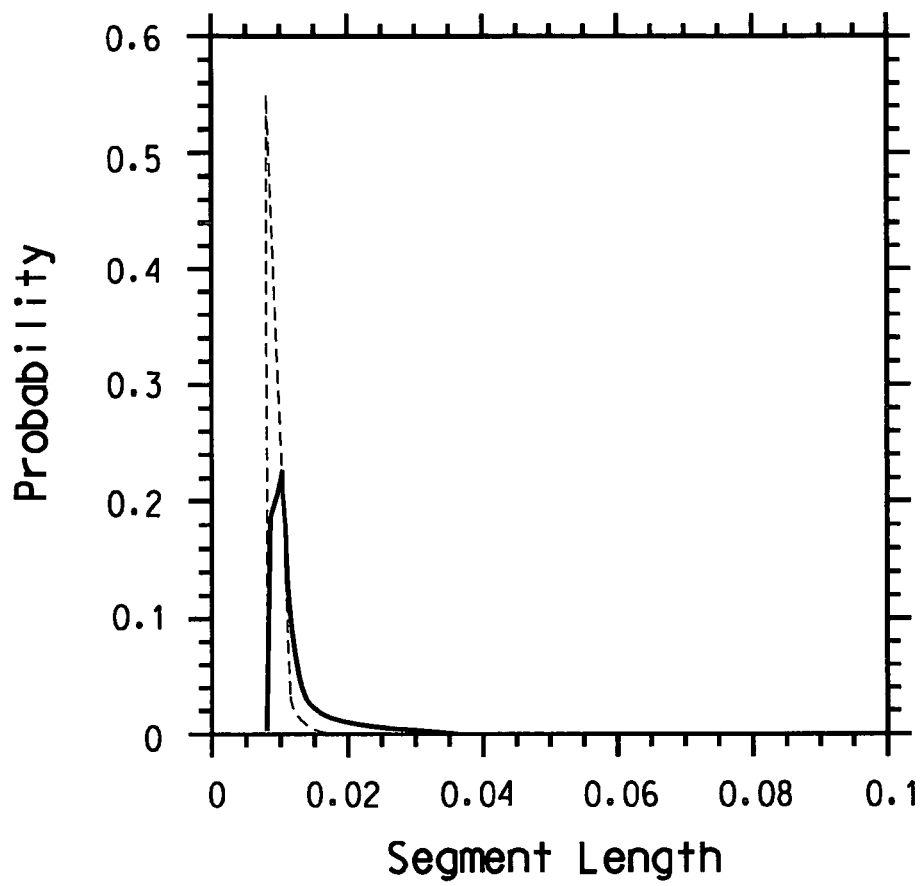
FIG. 5 is a graph showing the probability distribution for c=0.0001 and d=0.01 for the production of a composition comprising nano-structures having a specific distribution of lengths where a rectangular patterning system is used.

FIG. 5 illustrates that the most probable length in the distribution is the width of the retained resist layer, d. Despite the tubes having random orientation angle, the distribution is in a narrow range of tube lengths. A small population, less than about 5% of tube segments have length less than d, and a small population of tubes having lengths greater than d. If the tubes are oriented in a planar direction perpendicular to the cutting interface, there are no tubes longer than lengths d.

Circular Pattern

Figure 6:
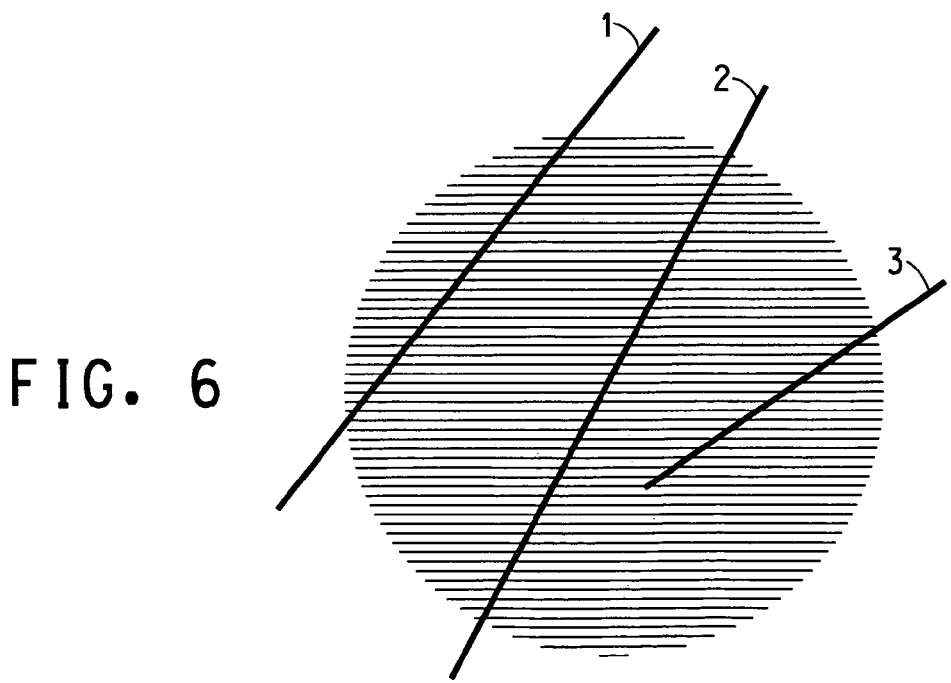
FIG. 6 Illustrates the production of a composition comprising nano-structures having a specific distribution of lengths where a circular patterning system is used.

In the following discussion the cutting pattern has the regions of retained segments fall within a circular resist coating. Referring to FIG. 6, all segments protruding out of the gray circular domain are destroyed as tubes are cut at the circular cutting interface. Several cutting examples are illustrated in FIG. 6, where the resist region is colored gray and the nanotubes are colored black.

Figure 7:
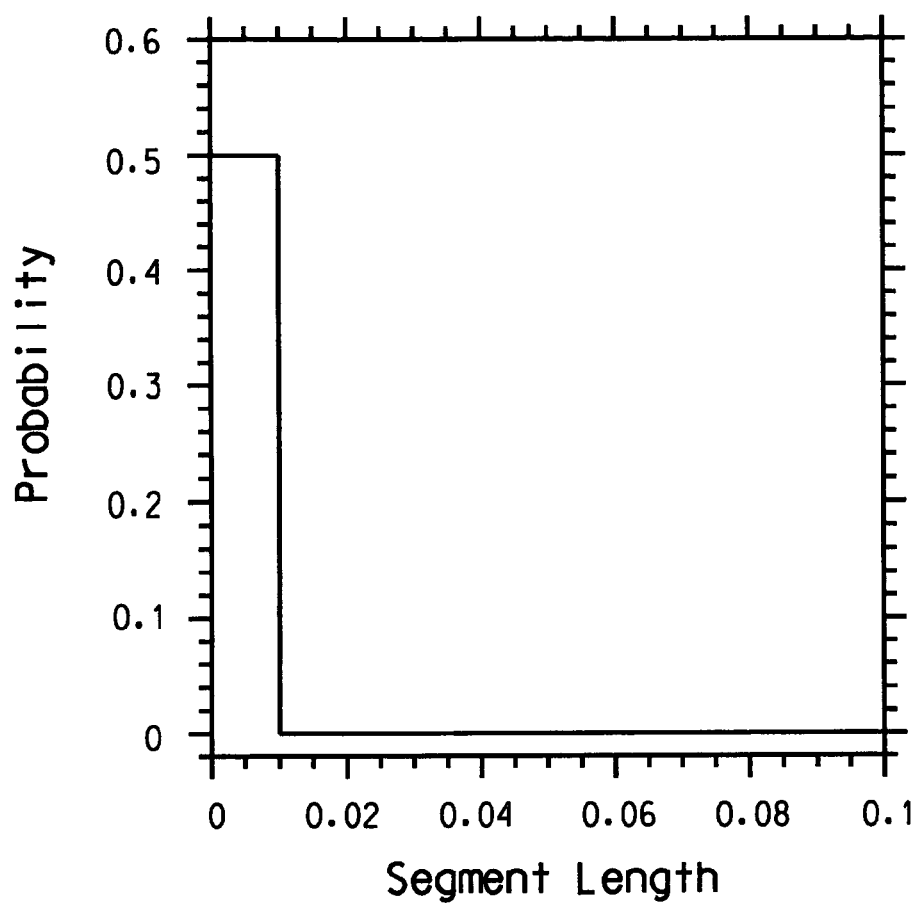
FIG. 7 is a graph showing the probability distribution for circular cutting pattern where the resist coating circle has a diameter of 0.1 and tube of initial length much greater than 1.

Tube 1 will contribute a segment equal to the chord length within the resist circle, this length is shorter than the circle's diameter. Tube 2 will contribute a segment about equal to the circle diameter. Tube 3 will contribute a segment which is less than the circle diameter, equivalent to a cut chord of the same length. The circular resist cutting pattern produces a cut segment distribution which is invariant to the tubes being aligned in any direction in the plane of the circle and ensures the maximum retained length is the circle diameter. Given all possible angular orientations and translational positions of tubes in the plane of the circle, we can again derive the expected cut segment length probability distribution based on simple geometry. For example FIG. 7 presents the segment length probability distribution for a resist coating circle diameter of 0.1 and tube of initial length much greater than 1. In this case the cut segment length probability distribution will be uniform for lengths between zero and the circle diameter. There will be no segment lengths greater than the circle diameter.

Combination of Circles and Rectangles

Figure 8:
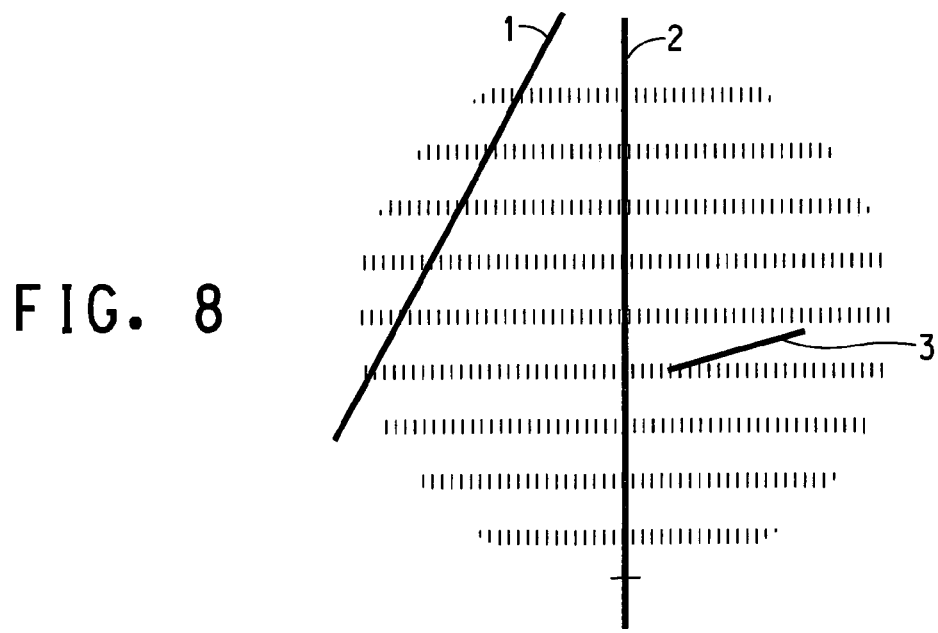
FIG. 8 illustrates the production of a composition comprising nano-structures having a specific distribution of lengths where both circular and rectangular patterning systems are used.

It may be advantageous to combine shape elements from the previous two examples to produce a resist coating pattern in the form of parallel lines confined within a circle. Referring to FIG. 8, the tube sections within the gray pattern will be protected from cutting by the resist coating, while tube sections within the white regions will be removed.

In this case Tubes 1, 2 and 3 will each contribute short length tube sections and all sections must be less than the circle diameter. If the main resist coating length is 0.01 and the circle diameter is 0.015, then for tubes with random orientation angle, we can expect a cut segment probability distribution to be similar to that shown in FIG. 9.

Figure 9:
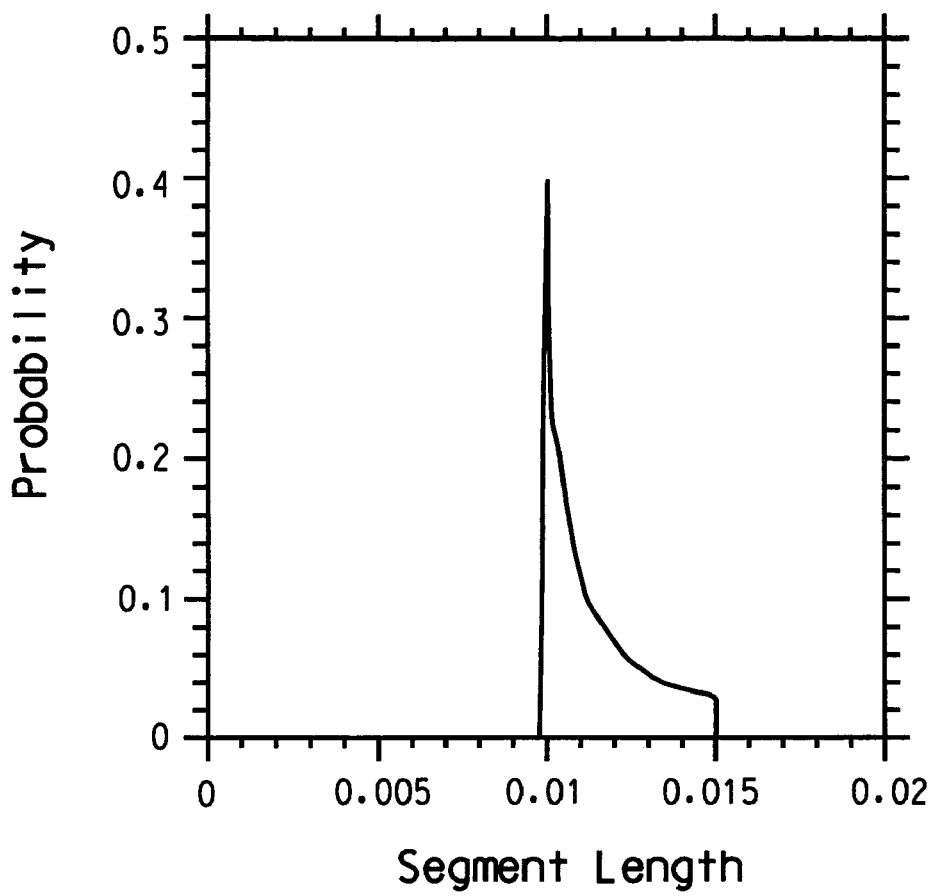
FIG. 9 is a graph of the probability distribution for the combination of circular and rectangular cutting patterns, where the main resist coating length is 0.01 and the circle diameter is 0.015.

As seen in FIG. 9 the tail of lengths longer than the resist coating spacing has been truncated by the circle circumscribing the array of parallel gray regions. This results in a much narrower length distribution than the first example.

Concentric Annuli

Figure 10:
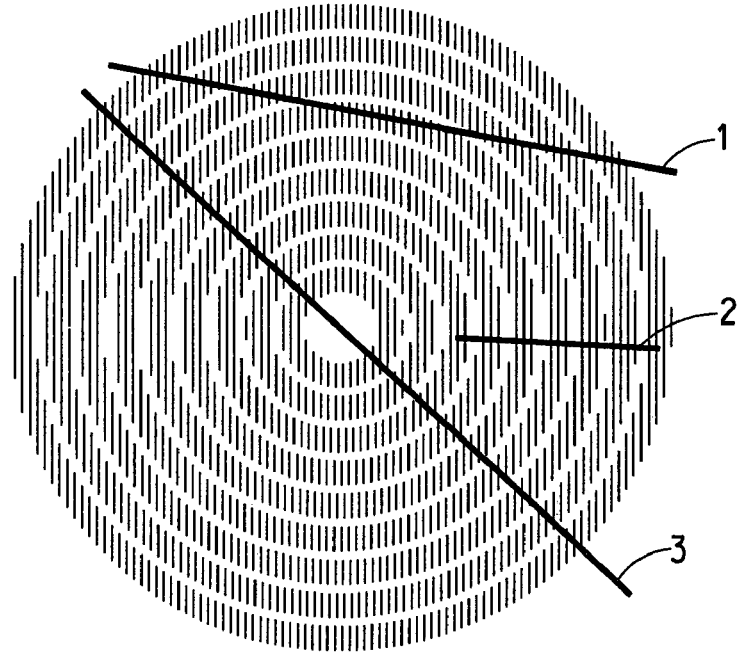
FIG. 10 Illustrates the production of a composition comprising nano-structures having a specific distribution of lengths where an annular patterning system is used.

Similar narrow length distributions are obtained by cutting with protective coatings arranged in a series of concentric annuli, as shown in FIG. 10.

Here each of the gray annuli have the same thickness. Tubes 1, 2 and 3 will only contribute segment lengths less than the largest inscribable chord within the largest gray annulus. The most probable segment length will be equal to the annuli thickness, and this result is also invariant to the orientation angles of the initial tubes being cut.

We can obtain nearly any desired cut length distribution by superposing the aforementioned patterns with different characteristic dimensions.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions.

Example 1

Application of a Positive Resist to Nanotube Cutting Using a Polymeric Matrix as the Dispersant Layer A dispersion of 0.1% (w/w) carbon nanotubes in Shipley (Marlborough, Mass.) AR2 antireflective coating (ARC), was prepared by sonication in a water bath for 8 hours. This dispersion was spun onto a 4 inch silicon wafer at a speed of 2600 RPM for 30 seconds, then the wafer was baked at 205° C. for 1 minute. Shipley positive photoresist UV 113.4 was spun onto the wafer at a speed of 2800 RPM for 30 s. The wafer was then baked at 135° C. for 1 minute. The coated wafer was exposed through a standard resolution pattern photomask with 248 nm light at an intensity of 55 mJ/cm$^2$ (using a Nikon NSR 1505 EX-1 stepper Tokyo, Japan). The exposed wafer was baked at 130° C. for 90 seconds, then developed for 45 s in AZ 300 MIF an aqueous base developer (Clariant Corp., Somerville, N.J.), rinsed with deionized water, and dried with filtered nitrogen. This left the dispersant layer revealed in the uv-exposed regions. The wafer was etched in a 90 W oxygen plasma for a length of time sufficient to cut the tubes without removing the protecting resist layer (nominally 30 seconds) using an Applied Materials (Santa Barbara, Calif.) Reactive Ion Etching system with a pressure of 30 mTorr. The lengths of the oxygen plasma etching step used are shown in Table 1 for wafers 93 and 96.

TABLE 1

| Example | Wafer # | ARC type | Resist Type | Etch Time (s) |
|---------|---------|----------|-------------|---------------|
| 5a | 93 | Shipley AR2 | Shipley UV113.4 | 30 |
| 5e | 96 | Shipley AR2 | Shipley UV113.4 | 60 |

Using the process and cutting device of Example 1, it is expected that nanotubes will be cut to a length of about 10 nanometers to about 2 microns.

Example 2

Figure 11:
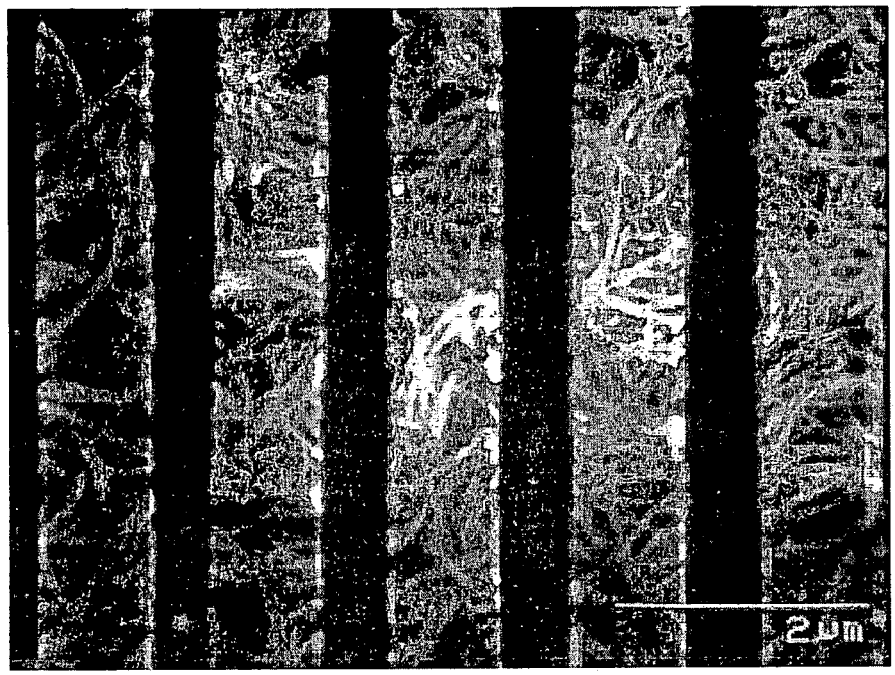
FIG. 11 shows cutting of the dispersed carbon nanotubes from Example 2 using scanning electron microscopy.

Application of a Positive Resist to Nanotube Cutting Using a Different Polymeric Matrix as the Dispersant Layer A dispersion of 0.01% (w/w) carbon nanotubes in Brewer DUV 52 antireflective coating (ARC) (Brewer Science, Inc., Rolla, Mo.), was prepared by sonication. This dispersion was spun onto a 4 inch silicon wafer at a speed of 6000–6200 RPM for 30 seconds, then the wafer was baked at 205° C. for 1 minute. Shipley positive photoresist UV 113.4 was spun onto the wafer at a speed of 2800 RPM for 30 s. The wafer was then baked at 135° C. for 1 minute. The coated wafer was exposed through a patterned photomask with 248 nm light at an intensity of 25 mJ/cm$^2$ (using a Nikon NSR 1505 EX-1 stepper Tokyo, Japan). The exposed wafer was baked at 130° C. for 60–90 seconds, then developed for 45 s in AZ 300 MIF an aqueous base developer (Clariant Corp., Somerville, N.J.), rinsed with deionized water, and dried with filtered nitrogen. This left the dispersant layer revealed in the uv-exposed regions. The wafer was etched in a 90 W oxygen plasma for 90 seconds using an Applied Materials (Santa Barbara, Calif.) Reactive Ion Etching system with a pressure of 30 mTorr. The lengths of the oxygen plasma etching step used are shown in Table 2 for wafers 371 through 374 and wafers 429 through 432. An SEM image of wafer 374 is shown in FIG. 11. The cutting of the dispersed carbon nanotubes are shown using scanning electron microscopy (SEM) (Hitachi S2100). For a typical analysis a small piece of processed wafer (ca. 1×1 cm$^2$ approx.) was imaged. In this Figure, wafer 374 is shown. The cut carbon nanotubes are shown in the anti reflective coating.

TABLE 2

| Example | Wafer # | ARC type | Resist Type | Etch Time (s) |
|---------|---------|----------|-------------|---------------|
| | 372 | Brewer DUV52 | Shipley UV113.4 | 60 |
| | 373 | Brewer DUV52 | Shipley UV113.4 | 75 |
| | 374 | Brewer DUV52 | Shipley UV113.4 | 90 |
| | 429 | Brewer DUV52 | Shipley UV113.4 | 90 |
| | 430 | Brewer DUV52 | Shipley UV113.4 | 120 |
| | 431 | Brewer DUV52 | Shipley UV113.4 | 105 |
| | 432 | Brewer DUV52 | Shipley UV113.4 | 135 |

Using the process and cutting device of Example 2, it is expected that nanotubes will be cut to a length of about 10 nanometers to about 2 microns.

Example 3

Application of a Negative Resist to Nanotube Cutting Using a Polymeric Matrix as the Dispersant Layer Carbon nanotubes were dispersed in 20 mL Shipley AR2 antireflective coating and sonicated in a water bath for 12 hours. This dispersion was spun onto a 4 inch silicon wafer at a speed of 2600 RPM for 30 seconds, then the wafer was baked at 205° C. for 1 minute. Shipley negative photoresist UVN30 was spun onto the dispersant layer of the wafer at a speed of 3000 RPM for 30s. The wafer was then baked at 110° C. for 1 minute. The coated wafer was exposed through a standard resolution pattern photomask with 248 nm light at an intensity of 28.5 mJ/cm$^2$ (using a Nikon NSR 1505 EX-1 stepper). The exposed wafer was baked at 105° C. for 60 seconds, then developed for 30 seconds in AZ 300 MIF developer, rinsed with DI water, and dried with filtered nitrogen. This left the dispersant layer revealed in the UV-unexposed regions. Wafer 154 was etched in a 90 W oxygen plasma for 30 seconds using an Applied Materials Reactive Ion Etching system with a pressure of 30 mTorr. The length of the oxygen plasma etching step used for wafers 154 through 162, are shown in Table 3. It should also be noted that carbon nanotubes around the perimeter of the wafer and between exposure steps are completely obliterated and cleared away.

TABLE 3

| Example | Wafer # | ARC type | Resist type | Etch time (s) |
|---|---|---|---|---|
| | 154 | Shipley AR2 | Shipley UNV30 | 30 |
| | 155 | Shipley AR2 | Shipley UNV30 | 60 |
| | 156 | Shipley AR2 | Shipley UNV30 | 90 |
| | 157 | Shipley AR2 | Shipley UNV30 | 120 |
| | 158 | Shipley AR2 | Shipley UNV30 | 150 |
| | 161 | Shipley AR2 | Shipley UNV30 | 90 |
| | 162 | Shipley AR2 | Shipley UNV30 | 120 |

Using the process and cutting device of Example 3, it is expected that nanotubes will be cut to a length of about 10 nanometers to about 2 microns.

Example 4

Application of a Negative Resist to Nanotube Cutting Using a Low Viscosity Dispersant Layer A dispersion of 0.01% (w/w) carbon nanotubes in a 50/50 mixture of chloroform and dichlorobenzene was prepared by sonication in a water bath. This dispersion was pipetted onto a 4-inch silicon wafer and allowed to sit for 60 seconds prior to spinning at a speed of 1000 RPM for 60 seconds. The previous step of coating the wafer with the carbon nanotube dispersion was repeated 4 times to increase the loading of carbon nanotubes on the wafer. The wafers were coated with Microprime P-20 primer (SHIN-ETSU Chemical Co.) at a speed of 3000 RPM for 30 s. Shipley negative photoresist UVN 30 was spun onto the wafer at a speed of 3000 RPM for 30 s. The wafer was then baked at 100° C. for 1 minute. The coated wafer was exposed through a patterned photomask with 248-nm light at an intensity of 28 mJ/cm$^2$ (using a Nikon NSR 1505 EX-1 stepper (Tokyo, Japan). The exposed wafer was baked at 100° C. for 60 seconds, then developed for 30 s in AZ 300 MIF an aqueous base developer (Clariant Corp., Somerville, N.J.), rinsed with deionized water, and dried with filtered nitrogen. This left the area of the carbon nanotubes which was cut revealed in the UV-exposed regions. Wafer 473 was etched in a 90 W oxygen plasma for 30 seconds using an Applied Materials (Santa Barbara, Calif.) Reactive Ion Etching system with a pressure of 30 mTorr. The lengths of the oxygen plasma etching step used are shown in Table 4.

TABLE 4

| Example | Wafer # | Resist type | Etch time (s) | Extent of cutting |
|---|---|---|---|---|
| | 473 | Shipley UNV30 | 30 | cut |
| | 474 | Shipley UNV30 | 60 | cut |
| | 475 | Shipley UNV30 | 45 | cut |
| | 476 | Shipley UNV30 | 75 | cut |
| | 584 | Shipley UNV30 | 60 | cut |
| | 585 | Shipley UNV30 | 60 | cut |
| | 589 | Shipley UNV30 | 60 | cut |
| | 590 | Shipley UNV30 | 60 | cut |
| | 592 | Shipley UNV30 | 60 | cut |

Example 5

Application of a Positive Resist to Nanotube Cutting Using a Low Viscosity Dispersant Layer Samples were treated as in Example 4 except for the following: Shipley positive photoresist UV113 was spun onto the wafer at a speed of 3000 RPM for 30 s. The wafer was then baked at 110° C. for 1 minute. The coated wafer was exposed through a patterned photomask with 248-nm light at an intensity of 25 mJ/cm$^2$ (using a Nikon NSR 1505 EX-1 stepper (Tokyo, Japan). The exposed wafer was baked at 130° C. for 90 seconds, then developed for 30 s in AZ 300 MIF an aqueous base developer (Clariant Corp., Somerville, N.J.), rinsed with deionized water, and dried with filtered nitrogen. This left the area of the carbon nanotubes that was cut revealed in the uv-exposed regions. Wafer 467 was etched in a 90 W oxygen plasma for 60 seconds using an Applied Materials (Santa Barbara, Calif.) Reactive Ion Etching system with a pressure of 30 mTorr. The lengths of the oxygen plasma etching step used are shown in Table 5 for wafers 467 through 470 and 574 through 583.;

TABLE 5

| Example | Wafer # | Resist type | Etch time (s) | Extent of cutting |
|---|---|---|---|---|
| | 467 | Shipley UV113 | 60 | Partially cut |
| | 468 | Shipley UV113 | 90 | cut |
| | 469 | Shipley UV113 | 120 | cut |
| | 470 | Shipley UV113 | 75 | cut |
| | 574–583 | Shipley UV113 | 90 | cut |

Example 6

Removing the Negative Resist from the Cut CNTs

Figure 12:
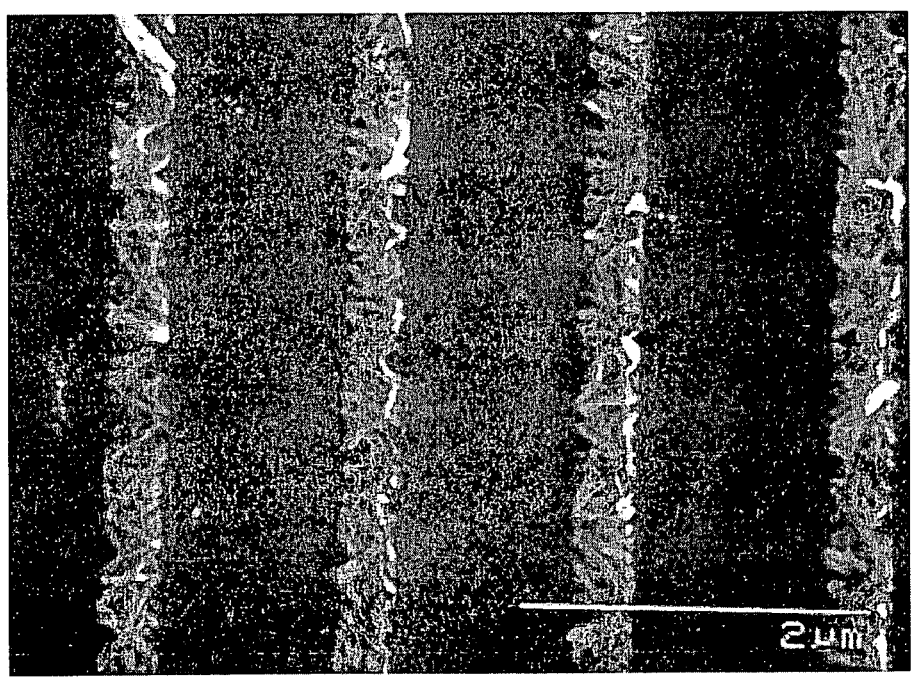
FIG. 12 shows removal of the resist from the dispersed carbon nanotubes of Example 6 using scanning electron microscopy.

Wafer 474 from Example 4 was further treated by ultrasonication in a bath in dimethyl acetamide for 10 minutes. The wafer was then removed, washed in ethanol and dried. A typical scanning electron microscopy (SEM) (Hitachi S2100) image of wafer 474 illustrating the cutting of the dispersed carbon nanotubes is shown in FIG. 12.

Other solvents which give similar results include NMP, ethanol, butanol, and THF.

Example 7

Removing the Arc and Resist Layers from the Cut CNTs

Figure 13:
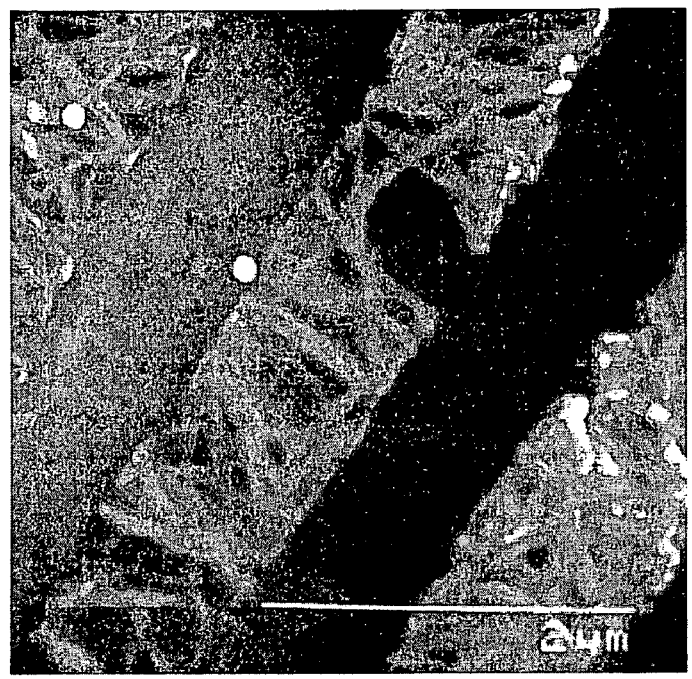
FIG. 13 shows removal of the resist from the dispersed carbon nanotubes of Example 7 using scanning electron microscopy.

Samples from Example 2 were further treated in tetramethylammonium hydroxide (10% at 50° C.) which removed the anti reflective coating. The sample was then heated in a 10% solution in ethanol for four hours. The wafer was then removed, washed in ethanol and dried. The SEM (Hitachi S2100) image of wafer 374 shown in FIG. 13 shows well defined cut carbon nanotubes.

Example 8

Figure 14:
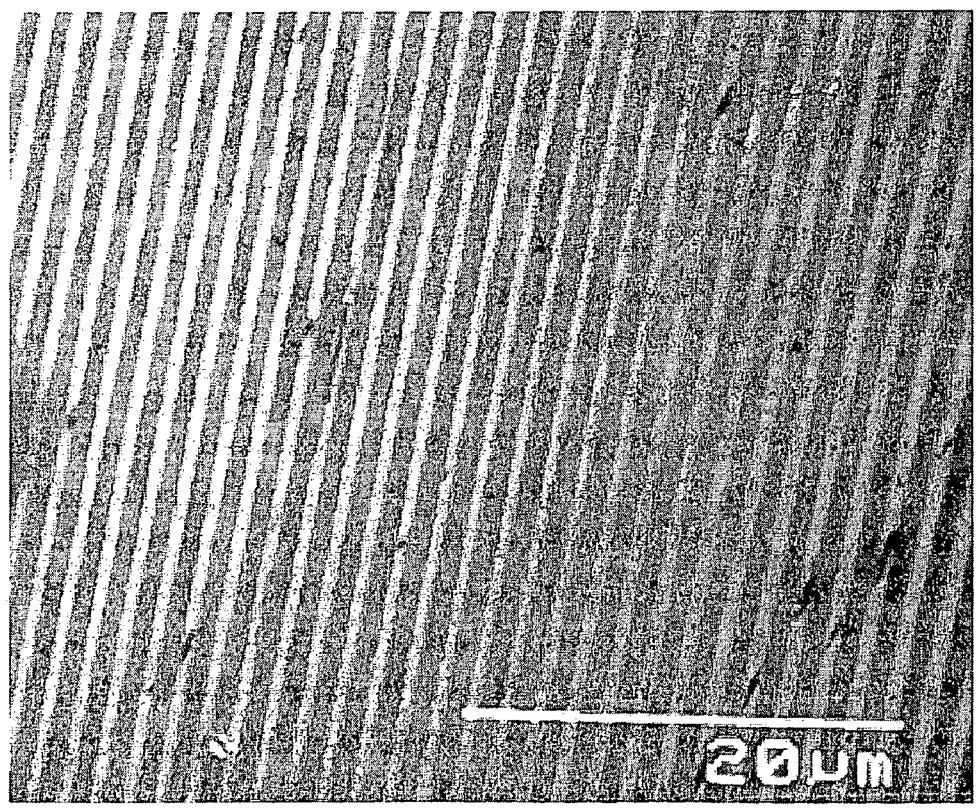
FIG. 14 is an SEM showing the removal of cut nanotubes from the solid substrate wafer as described in Example 8.

Removing the Arc and Positive Resist Layers from the Cut CNTs Followed by Removal of the Carbon Nanotubes From the Substrate Samples from Example 7 were further treated by heating in a solvent, such as dimethylformamide. The wafer was heated in DMF, overnight at 50° C. and the wafer was then sonicated in an ultrasonic bath for three minutes. SEM (FIG. 14) shows that the cut carbon nanotubes have become detached and were removed from the wafer. Solid and light lines seen in FIG. 14 are patterns left by the etching process but illustrate the removal of almost all CNT's from the safer.

Example 9

Removing the Negative Resist Layers from the Cut CNTS Followed by Removal of the Carbon Nanotubes from the Substrate Wafer 473 from Example 4 was sonicated in dimethylacetamide for five minutes, followed by treatment in 0.25 M sodium hydroxide (20 mls) for seven minutes. The solution was then filtered using an alumina filter membrane (with a pore size of about 0.1 to 0.2 microns). The filter was then washed with water and left to dry. SEM confirmed the presence of nanotubes on the filter.

Example 10

Removing the Positive Resist from the Cut CNTs Followed by Removal of the Carbon Nanotubes from the Substrate Wafer 580 from Example 5 was washed in n-methylpyrolidonone (NMP) to remove the resist layer.

Figure 15:
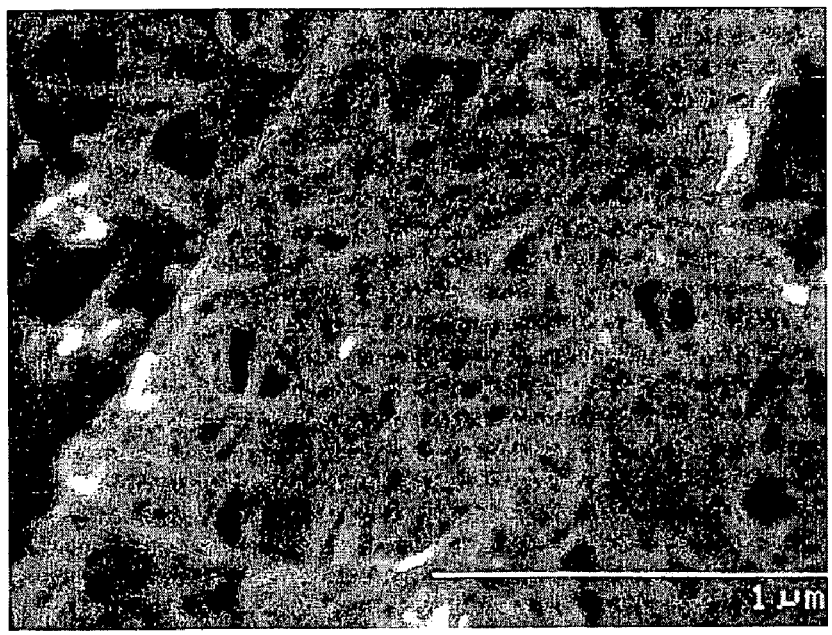
FIG. 15 is an SEM showing the recovered nanotubes of Example 10.

A piece of this wafer was then put in nano-strip (sulfuric acid and hydrogen peroxide mixture available from Cyantek Corporation in Fremont, Calif.) for four hours at room temperature. It was rinsed in water followed by ethanol. The wafer was then ultrasonicated in ethanol (ca. 20 mls) in a bath for one hour. The solution was then passed through an 0.1 micron sized filter using a syringe, washed with ethanol and left to dry. The recovered nanotubes were easily observable using scanning electron microscopy as seen in FIG. 15.

Example 11

Cut CNTs Followed by Reconnectinq Cut Ends with a Gold Metal Layer

Sample 577 from Example 5 was coated with 10 nm titanium and 50 nm gold metal in a metal evaporator. A solvent based lift-off process with NMP was used similar to that described in Example 10 to remove the gold coated resist areas on the wafer, leaving cut carbon nanotubes connected on each end to a gold metallic surface. The presence of the metallized nanotube was confirmed by SEM. This example demonstrates a process whereby cut nanotubes can be used in place as a device.

Example 12

Electron Beam Patterning for Cutting

Figure 16:
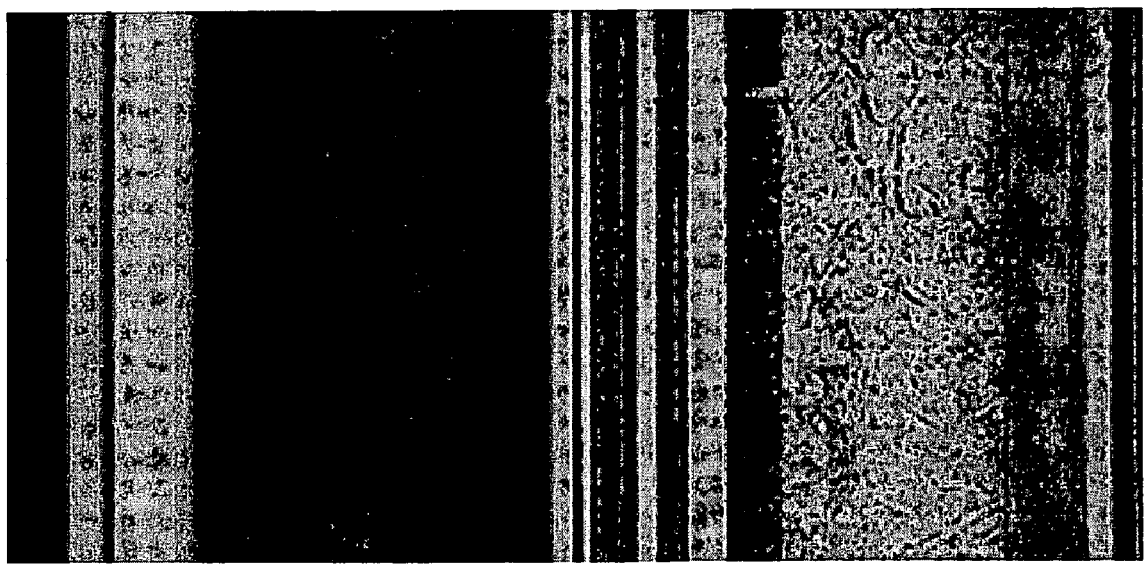
FIG. 16 shows an atomic force microscopic image showing uncut carbon nanotubes next to a 320 nm wide resist line from the e-beam process.

A 4" wafer (#465) was coated with carbon nanotubes as prepared in Example 4. A 0.01% suspension of HiPCo single wall carbon nanotubes in a 50%/50% mixture of dichlorobenzene and chloroform was sonicated and spun onto a 4" Si wafer. The wafer was baked at 200° C. for 5 minutes. Primer P20 was spun onto the wafers at 3000 rpm for 30 s. Hydrogen Silsesquioxane (Fox-17, Dow Corning, Inc.) resist was spun onto the wafer at 3000 rpm for 30 s. The resulting wafer was baked at 200° C. for 2 minutes. Using a Leica 100 KeV Field Emission VB6 e-beam tool, lines nominally 280 microns long with widths of 5, 10, 20, 40, 80, 160, and 320 nm, were written in an 4×4 array (16 locations) with lowest electron beam dose of 500 microcoulombs/cm$^2$ and increasing by a factor of 1.075 for each location. The exposed wafer was developed (using developer TMAH/ MF321) for 14.5 minutes. The wafer was examined using atomic force microscopy after development. FIG. 16 shows a 320 nm resist line and a region to its right with a mat of uncut nanotubes.

Figure 17:
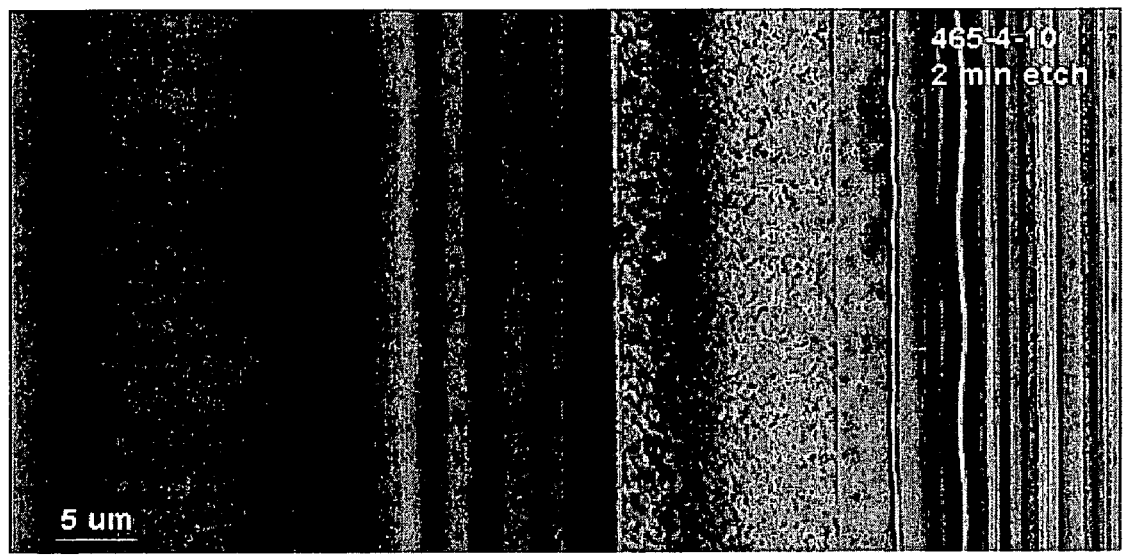
FIG. 17 shows an atomic force microscopic image after carbon nanotube etching showing the remaining resist line, but no carbon nanotubes in the uncovered area.

The wafer was exposed to 2 minutes of a microwave oxygen plasma at 40% power, 2 scfh flow rate and 10 psi pressure. FIG. 17 shows an AFM picture near resist lines, which survived the plasma exposure. However, the carbon nanotubes not protected by the resist have been remove by the plasma, leaving, by inference, cut nanotubes under the resist lines. It is well established that e-beam lithography can print lines as narrow as 8 nm wide and up to 10 microns wide.

Example 13

Continuous Cutting

This Example illustrates a process in which all steps can be made continuous. One may begin by providing a continuous belt constructed from a flexible material, such as sheet metal or foil (say, aluminum or steel), or metallized Mylar. The belt width can vary between 10 mm and 10 m, and the speed can vary from 100 microns/s to 1 m/s. This belt moves continuously. It first enters a bath of desired nanotubes or other nanostructures dispersed in a suitable solvent. Types that would be suitable include CNT's dispersed in dichlorobenzene and chloroform, CNT's dispersed in a resist or an ARC, and surfactant dispersed aqueous CNT's. Generally, any of the dispersions described in previous examples would be suitable. The belt leaves the dispersion and is dried, resulting in deposition of nanotubes on the belt. The belt then optionally enters a bath of photoresist in its solvent, for example Shipley negative photoresist UVN30 or Shipley positive photoresist UV 113. The first two bath-dips may be repeated to build up multiple layers. Optionally another bath can deposit an intermediate release layer. Also optionally, each layer is baked prior to deposition of the subsequent layer. For example, UV113 is baked between 80 and 150° C. for 10–300 s. Each layer thickness typically ranges between 1 nm and 10 microns. After the desired layers (nanotubes+resist) have been obtained, the belt is exposed to patterned light in order to selectively expose the photoresist. Patterning is accomplished by one of several techniques. Large-scale patterning is accomplished using Interference or Holographic Lithography as discussed by Anderson et al., (E. Anderson, C. Horowitz, H. Smith, *Applied Physics Letters,* 43, 9, 874, 1983), or immersion interference lithography as discussed by Switkes et al., (M. Switkes, M. Rothschild, *J. Vac. Sci. Technol.* B 19, 6, p 2353–6, 2001). It can also be accomplished by a stepper rastering back and forth across the width. The belt is locally held stationary while the stepper rasters by introducing a variable-length fold in the belt after the last dip and before the exposure tool. Following exposure, the belt optionally enters a post-exposure bake oven with temperature ranging between 80 and 200° C. and residence time between 1 and 600s. The belt then enters a developing solution bath (cross-reference other examples). Residence times vary between 1 s and 600 s. The belt is rinsed clean by spraying with a solvent or water and/or by dipping in a bath. The belt is exposed to an oxygen plasma for times ranging between 1 s to 200 s to cut the exposed nanotubes. Following cutting, there is an optional rinsing step. The remaining resist lines and nanotubes are removed by dipping in one or more baths of lift-off solvent (cross reference other examples). Remaining recovery is as in other examples.

Example 14

End and Side CNT Functionalization

In place of an oxygen plasma as the previously example, chlorine or another halogen plasma could be used. This is optionally exposed to ammonia resulting in amine or amide terminated nanotubes.

Following cutting by an oxygen plasma, carbon nanotubes have a carboxylic acid end functionalization. The carboxylic acid can be converted to a range of active functional groups, for example acyl chlorides (via reaction of the carboxylic acid with thionyl chloride $SOCl_2$). The acyl chloride terminated carbon nanotubes can be reacted with an amine terminated nanoparticles (for example gold), to form an amide linked end-bound gold nanoparticle. Alternatively carboxylic acids can be coupled to amine modified molecules or particles using carbodiimide coupling chemistry (coupling of the carboxylic acid and amine).

Example 15

Application of Interference Photolithography to Nanotube Cutting

The photoresist coated wafer as prepared in Example 1 can also be exposed, without the use of a photomask, using an interference or immersion interference lithography stepper at any suitable lithography wavelength below 400 nm such as for example 248 nm light, 193 nm light or 157 nm light (as described by Smith or Switkes, supra) using an appropriate positive or negative photoresist for the lithography wavelength chosen. The exposed wafer will then be baked at an appropriate Post Exposure Bake (PEB) temperature such as 130° C. for 90 seconds, and then developed for 45 s in AZ 300 MIF TMAH developer, rinsed with deionized water, and dried with filtered nitrogen. This will leave the dispersant layer revealed in the uv-exposed regions. The patterned wafer can then be etched using one of the cutting methods such as a 90 W oxygen plasma for 10 seconds using an Applied Materials Reactive Ion Etching system with a pressure of 30 mTorr. The length of the oxygen plasma etching step used can be varied in time, and it is expected that nanotubes will be cut to a length of about 10 nanometers to about 2 microns.

Example 16

Application of Projection Immersion Photolithography to Nanotube Cutting

The photoresist coated wafer as prepared in Example 1 can also be exposed, using a photomask in a projection immersion lithography stepper at any suitable lithography wavelength below 400 nm such as for example 248 nm light, 193 nm light or 157 nm light (as described by Switkes, supra) using an appropriate positive or negative photoresist for the lithography wavelength chosen. The exposed wafer will then be baked at an appropriate Post Exposure Bake (PEB) temperature such as 130° C. for 90 seconds, and then developed for 45 s in AZ 300 MIF TMAH developer, rinsed with deionized water, and dried with filtered nitrogen. This will leave the dispersant layer revealed in the uv-exposed regions. The patterned wafer can then be etched using one of the cutting methods such as a 90 W oxygen plasma for 10 seconds using an Applied Materials Reactive Ion Etching system with a pressure of 30 mTorr. The length of the oxygen plasma etching step used can be varied in time, and it is expected that nanotubes will be cut to a length of about 10 nanometers to about 2 microns.

Example 17

Application of Nanoimprint Lithography, Thermal Type to Nanotube Cutting

The dispersion coated wafer as prepared in Example 1 can also be patterned using an nanoimprint lithography of the thermal type as discussed by Chou et al (S. Y. Chou, P. R. Krauss, P. J. Renstrom, *Science,* 272, p. 85–87 1996). In this case the dispersion coated wafer is further coated with a thermoplastic polymer such as PMMA or polycarbonate using a spin coating process and an appropriate post apply bake (PAB) of for example 120° C. for 60 seconds. Then with a master mask or embossing mask of for example etched $SiO_2$ quartz, in which the mask pattern is a relief image, the master mask is mechanically pressed into contact with the polymer coated wafer, and the mask and wafer heated above the glass transition temperature of the polymer, for example 200° C., and the polymer layer will deform to the master mask pattern. Upon cooling, the master mask is removed from contact with the dispersion and polymer coated wafer, and a replica image of the mask remains in the polymer. This will leave the dispersant layer revealed in the regions where the polymer layer has been removed by thermal flow. The patterned wafer can then be etched using one of the cutting methods such as a 90 W oxygen plasma for 10 seconds using an Applied Materials Reactive Ion Etching system with a pressure of 30 mTorr. The length of the oxygen plasma etching step used can be varied in time, and it is expected that nanotubes will be cut to a length of about 10 nanometers to about 2 microns.

Example 18

Application of Imprint Lithography, Step and Flash Type to Nanotube Cutting

The dispersion coated wafer as prepared in Example 1 can also be patterned using an nanoimprint lithography of the step and flash type as discussed by Colburn, et al., (M. Colburn, A. Grot, M. Amistoso, B. J. Choi, T. Bailey, J. Ekerdt, S. V. Sreenivasan, J. Hollenhorst, C. Grant Willson, Proc. SPIE Vol. 3676 p. 379–389 1999). In this case the dispersion coated wafer is first brought into contact a master mask, template or embossing mask of for example etched $SiO_2$ quartz or even a soft mask made of an appropriate polymeric material, in which the mask pattern is a relief image, the master mask is mechanically pressed into contact with the dispersion coated wafer. At this point a UV sensitive polymeric liquid, such as an organosilicon solution, is deposited between the master mask and the dispersion coated substrate. Once the photosensitive liquid has flowed into the mask relief pattern, then the mask is illuminated from behind, and the cross linking of the polymer solution (as occurs for example in a negative photoresist system) occurs. The template is then separated from the substrate, leaving behind the polymer replica of the mask template on the polymer layer. This will leave the dispersant layer revealed in the regions where the polymer layer has been removed by thermal flow. The patterned wafer can then be etched using one of the cutting methods such as a 90 W oxygen plasma for 10 seconds using an Applied Materials Reactive Ion Etching system with a pressure of 30 mTorr. The length of the oxygen plasma etching step used can be varied in time, and it is expected that nanotubes will be cut to a length of about 10 nanometers to about 2 microns.

Example 19

Measuring Length Distribution

Figure 18A:
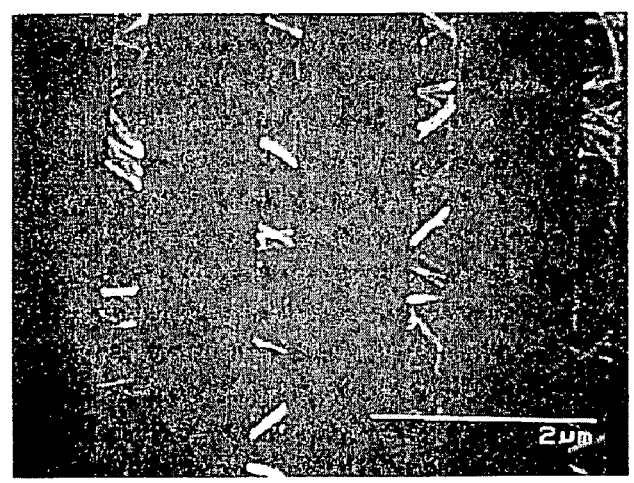
FIGS. 18A–18C shows cutting of the dispersed carbon nanotubes from Example 19 using scanning electron microscopy.
Figure 18B:
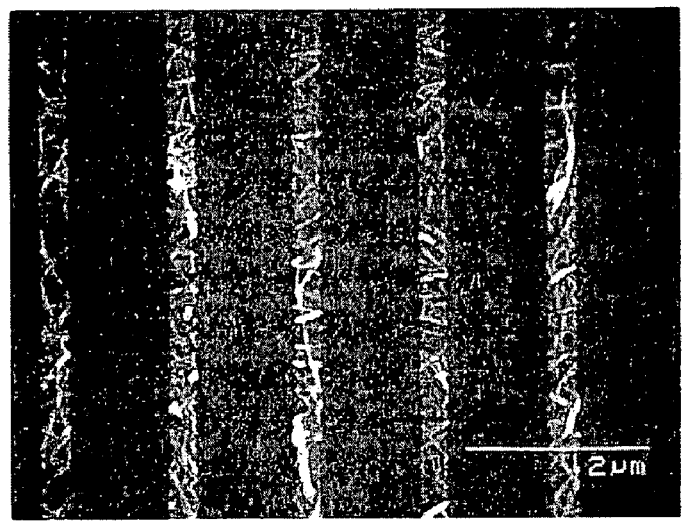
Figure 18C:
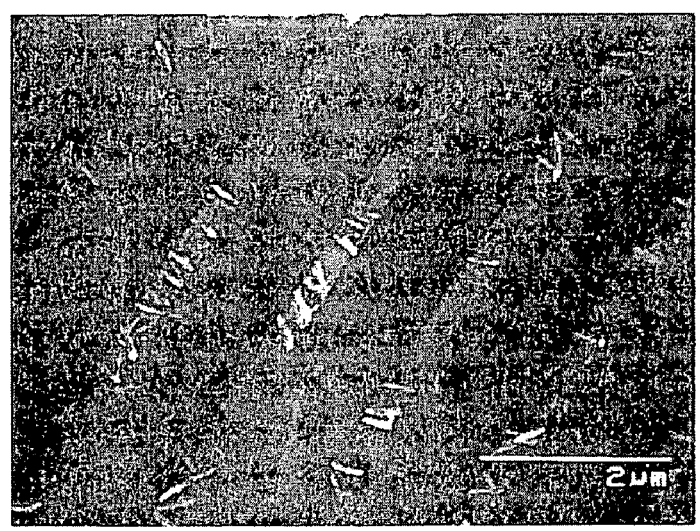

The length distribution of nanotubes cut by lines after removal of residual resist on wafer #474 from Example 6 was measured. Scanning electron microscopy images of cut nanotubes on the substrate were taken are shown in FIGS. 18A, B, and C.

Figure 19:
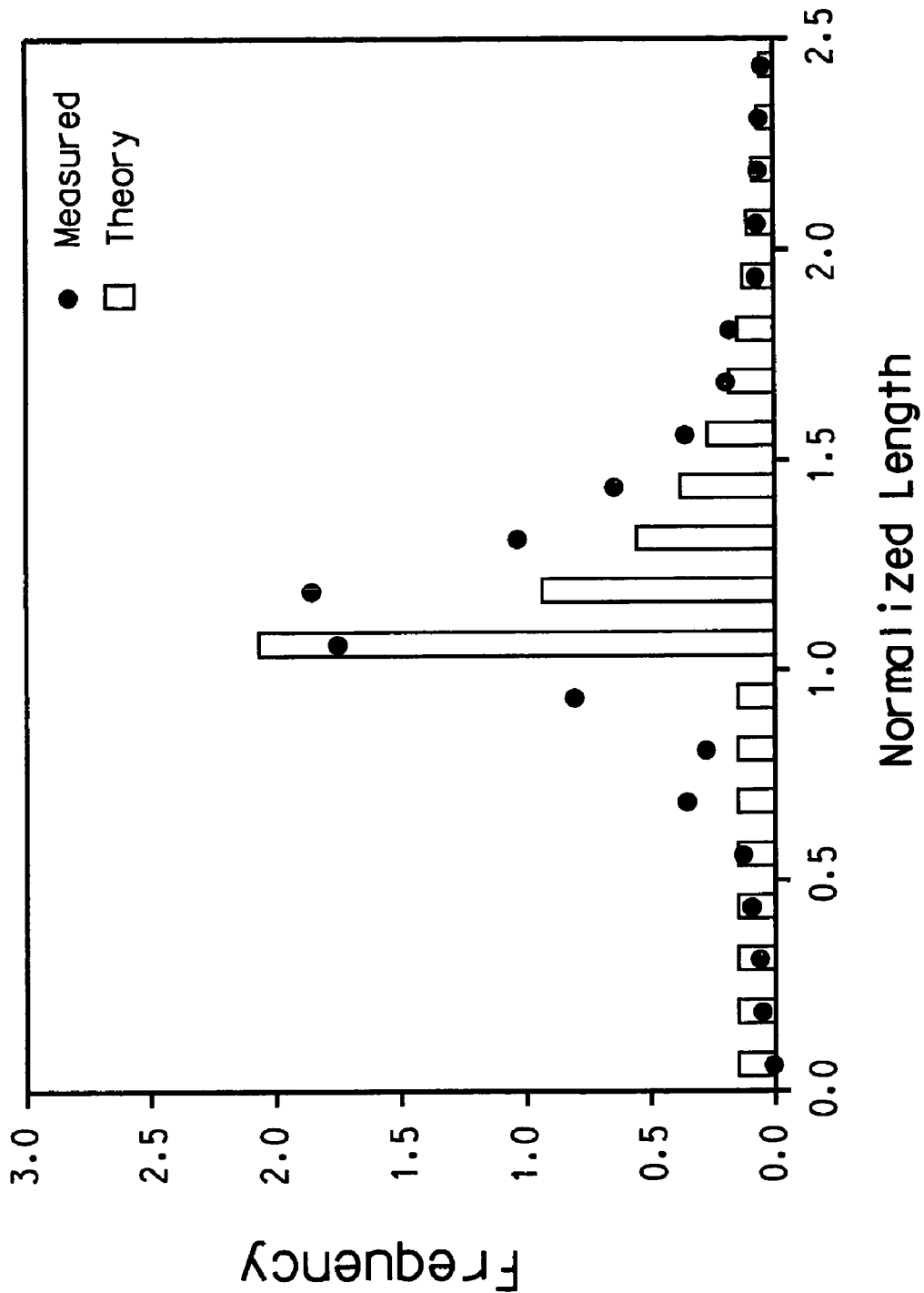
FIG. 19 illustrates the measured distribution of cut nanotubes from FIGS. 18A–18C.

Each image was digitized. Individual lengths (370 separate values) and the resist line width, d, were measured. The length measurements were scaled by the thickness of each bundle. FIG. 19 shows the measured distribution of lengths compared with the predicted distribution:

$$g(l') = \frac{1}{l'^2 \sqrt{l'^2 - 1}}$$

where the 'x' axis plots the normalized cut tube length, l'=l/d, corrected for the fraction of loose ends due to finite tube length. The measured distribution matched the predicted one well, suggesting that controlled distributions can be obtained in this way. The resist line width was determined to be 280 nm and thus the distribution of the cut nanotubes varies from about 270 nm to about 370 nm.

What is claimed is:

1. A method for cutting a population of nano-structures to a uniform length or distribution of lengths comprising:
    a) coating a population of nano-structures on a solid substrate wherein the nano-structures are spatially fixed on the surface of the substrate;
    b) identifying discrete portions of the coated nano-structures of step (a) according to a patterning system; and
    c) applying a cutting means the identified discrete portions of the nano-structures of step (b) whereby the nano-structures are cut to a uniform length or distribution of lengths;
wherein the nano-structures have a defined shape selected from the group consisting of tubes, rods, cylinders, bundles, wafers, disks, sheets, plates, planes, cones, slivers, granules, ellipsoids, wedges, and fibers.

2. A method according to claim 1 wherein the nano-structure is a nano-rod selected from the group consisting of carbon nanotubes, nano-bundles, polymeric nanofibers, natural nanofibers, and boron nitride nanofibers.

3. A method according to claim 2 wherein the nano-rod is a nanotube.

4. A method according to claim 1 wherein the solid substrate is comprised of materials selected from the group consisting of silicon, silicon dioxide, glass, metal, metal oxides metal alloys, polymers, ceramics, crystals and combinations thereof.

5. A method according to claim 1 wherein the solid substrate is optionally coated with a material selected from the group consisting of metal oxides, metal carbides, metal nittides, metal sulfides, metal borides, gallium arsenide, aluminum arsenide, aluminum sulfide; gallium sulfide, surfactants, proteins and combinations thereof.

6. A method according to claim 1 wherein from about 85% to about 100% of the cut nano-structures are of uniform length or a uniform distribution of lengths.

7. A method according to claim 6 wherein the uniform length to which the nano-structure is cut is from about 10 nm to about 1000 nm.

8. A method according to claim 6 wherein the uniform length to which the nano-structure is cut is from about 10 nm to about 400 nm.

9. A method according to claim 1 wherein the nano-structures are aligned prior to coating.

* * * * *